(12) United States Patent
Chitrakar et al.

(10) Patent No.: US 11,206,607 B2
(45) Date of Patent: Dec. 21, 2021

(54) COMMUNICATION APPARATUS AND COMMUNICATION METHOD FOR LOW POWER FAST SMART SCANNING

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/771,875

(22) PCT Filed: Dec. 21, 2018

(86) PCT No.: PCT/JP2018/047355
§ 371 (c)(1),
(2) Date: Jun. 11, 2020

(87) PCT Pub. No.: WO2019/131548
PCT Pub. Date: Jul. 4, 2019

(65) Prior Publication Data
US 2021/0185597 A1    Jun. 17, 2021

(30) Foreign Application Priority Data

Dec. 25, 2017 (JP) .............................. JP2017-247681
Feb. 7, 2018 (JP) .............................. JP2018-020069

(51) Int. Cl.
*H04W 48/16* (2009.01)
(52) U.S. Cl.
CPC .................................. *H04W 48/16* (2013.01)

(58) Field of Classification Search
CPC . H04W 48/16; H04W 52/0235; H04W 84/12; H04W 52/0241; H04W 52/0216; Y02D 30/70
See application file for complete search history.

(56) References Cited

U.S. PATENT DOCUMENTS

2012/0063340 A1* 3/2012 Waters ................. G01S 5/0242
370/252
2015/0181507 A1* 6/2015 Park ................. H04W 52/0229
370/311
(Continued)

FOREIGN PATENT DOCUMENTS

WO    WO-2019245158 A1 * 12/2019 ............ H04W 48/16

OTHER PUBLICATIONS

Extended European Search Report, dated Feb. 12, 2021, for European Application No. 18895819.3, 10 pages.
(Continued)

*Primary Examiner* — Minjung Kim
(74) *Attorney, Agent, or Firm* — Seed IP Law Group LLP

(57) ABSTRACT

The present disclosure provides a communication apparatus, comprising: Primary Connectivity Radio (PCR) circuitry which, in operation, receives, from an Access Point (AP), an element that indicates at least one WUR discovery channel used for transmission of a WUR Discovery frame; Wake Up Receiver (WURx) circuitry which, in operation, is used to scan WUR discovery channels for WUR Discovery frames; and a controller which, in operation, prompts the WURx circuitry to scan a WUR discovery channel from the at least one WUR discovery channel based on information, received at the PCR circuitry or the WURx circuitry, that represents a number of APs for each of the at least one WUR discovery channel, each of the APs transmitting WUR Discovery frames on the WUR discovery channel.

20 Claims, 33 Drawing Sheets

(56) References Cited

U.S. PATENT DOCUMENTS

| | | | |
|---|---|---|---|
| 2015/0289142 A1* | 10/2015 | Abeysekera | H04W 72/0453 |
| | | | 370/338 |
| 2016/0219408 A1* | 7/2016 | Yang | H04W 52/0245 |
| 2016/0249279 A1* | 8/2016 | Koorapaty | H04W 8/005 |
| 2019/0141620 A1* | 5/2019 | Pujari | H04W 48/16 |
| 2020/0068486 A1* | 2/2020 | Asterjadhi | H04W 48/08 |
| 2020/0280918 A1* | 9/2020 | Huang | H04W 52/0229 |
| 2020/0404589 A1* | 12/2020 | Wang | H04W 52/0235 |

OTHER PUBLICATIONS

Nan et al., "Consideration on WUR frame for Fast Scanning," doc.: IEEE 802.11-16/1619r0, Nov. 1, 2017, 12 pages.

Huang, "Specification Framework for TGba," IEEE 802.11-17/0575r7 (IEEE 802.11-15/0132r157), Nov. 29, 2017, 13 pages.

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," Approved Dec. 7, 2016, 3,534 pages.

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Fast Initial Link Setup," Second Printing: Apr. 14, 2017, Approved Dec. 7, 2016, 164 pages.

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation," Approved Dec. 7, 2016, 594 pages.

International Search Report, dated Mar. 12, 2019, for corresponding International Application No. PCT/JP2018/047355, 1 page.

Li et al., "Follow-Up on WUR Discovery Frame and Discovery Channel," IEEE 802.11 17/1608r6, Nov. 8, 2017, 14 pages.

Yu et al., "WUR Usage Model Document," IEEE 802.11-17/0029r10, Sep. 13, 2017, 23 pages.

* cited by examiner

3100

| Country / Region Index | Country / Region |
|---|---|
| 0 | United States |
| 1 | Europe |
| 2 | Japan |
| 3 | Global |
| 4 | China |
| 5 - 7 | Reserved |

| Operating Class & Channel Index | Operating class | Channel starting frequency (GHz) | Channel spacing (MHz) | Channel Number | Behavior limits set |
|---|---|---|---|---|---|
| 0 | 1 | 5 | 20 | 36 | |
| 1 | 1 | 5 | 20 | 40 | |
| 2 | 1 | 5 | 20 | 44 | |
| 3 | 1 | 5 | 20 | 48 | |
| 4 | 2 | 5 | 20 | 52 | DFS_50_100_Behavior |
| 5 | 2 | 5 | 20 | 56 | DFS_50_100_Behavior |
| 6 | 2 | 5 | 20 | 60 | DFS_50_100_Behavior |
| 7 | 2 | 5 | 20 | 64 | DFS_50_100_Behavior |
| 8 | 3 | 5 | 20 | 149 | NomadicBehavior |
| 9 | 3 | 5 | 20 | 153 | NomadicBehavior |
| 10 | 3 | 5 | 20 | 157 | NomadicBehavior |
| 11 | 3 | 5 | 20 | 161 | NomadicBehavior |
| .. | .. | .. | .. | .. | .. |
| 40 | 18a,b | 5 | 20 | 172 | ITS nonmobile operations, ITS mobile operations |
| .. | .. | .. | .. | .. | .. |
| 51 | 18a,b | 5 | 20 | 183 | ITS nonmobile operations, ITS mobile operations |
| 52 - 127 | Reserved | Reserved | Reserved | Reserved | Reserved |

FIG. 31B

COMMUNICATION APPARATUS AND COMMUNICATION METHOD FOR LOW POWER FAST SMART SCANNING

TECHNICAL FIELD

The present disclosure is generally related to a communication apparatus and a communication method.

BACKGROUND ART

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and coexists with legacy IEEE 802.11 devices in the same frequency band. The PCR may be any of the existing mainstream IEEE 802.11 amendments (802.11a, 802.11g, 802.11n or 802.11ac) or even other applicable future amendments (e.g. 802.11ax). The purpose of the WUR apparatus is to trigger the transition of the PCR apparatus out of sleep upon reception of a valid wake-up packet, while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one milliwatt, which is much lesser compared to the active receiver power consumption of the PCR apparatus. Devices with a WUR apparatus may be called WUR devices and WUR mode may refer to operation mode where only the WUR is in operation while the PCR is turned off. The 802.11ba Taskgroup is currently also considering enhancing the network discovery procedure by utilizing the WUR apparatus. Network discovery procedure utilizing the WUR apparatus may be known as Smart Scanning to differentiate it from the network discovery using the PCR which may be referred to as PCR scanning or simply as scanning.

The IEEE 802.11ba amendment is primarily targeted at applications and Internet-of-Things (IOT) use cases in which the communication devices are usually powered by a battery and it is highly desirable to extend the battery lifetime while maintaining reasonably low latency. However, it is possible for devices that implement WUR apparatus for Smart Scanning may be mainstream devices such as smartphones or tablets whose primary motivation is faster network discovery rather than battery savings.

CITATION LIST

Non Patent Literature

[NPL 1]
IEEE Std 802.11-2016
[NPL 2]
IEEE Std 802.11ai-2016
[NPL 3]
IEEE Std 802.11ah-2016
[NPL 4]
IEEE 802.11-17/0575r7 (IEEE 802.11-15/0132r157), Specification Framework for TGba, November 2017
[NPL 5]
IEEE 802.11-17/0029r10, WUR Usage Model Document
[NPL 6]
IEEE 802.11-17/1608r6: Update on WUR discovery frame for smart scanning

SUMMARY OF INVENTION

Technical Problem

Channel scanning and network discovery usually take up lots of time and consequently a wireless device may expend a significant portion of its battery scanning for new networks either for new connection setup or for roaming purposes. Additionally, the scanning latency can prove to be disruptive during roaming for certain types of latency sensitive applications such as VOIP (Voice over IP) or Video calls etc.

One non-limiting and exemplary embodiment of the present disclosure facilitates providing means to reduce the scanning latency.

Solution to Problem

In one general aspect, the techniques disclosed here features: a communication apparatus, comprising: Primary Connectivity Radio (PCR) circuitry which, in operation, receives, from an Access Point (AP), an element that indicates at least one WUR discovery channel used for transmission of a WUR Discovery frame; Wake Up Receiver (WURx) circuitry which, in operation, is used to scan WUR discovery channels for WUR Discovery frames; and a controller which, in operation, prompts the WURx circuitry to scan a WUR discovery channel from the at least one WUR discovery channel based on information, received at the PCR circuitry or the WURx circuitry, that represents a number of APs for each of the at least one WUR discovery channel, each of the APs transmitting WUR Discovery frames on the WUR discovery channel.

It should be noted that general or specific embodiments may be implemented as a system, a method, an integrated circuit, a computer program, a storage medium, or any selective combination thereof.

Advantageous Effects of Invention

The communication apparatus and communication method described in the present disclosure facilitate providing means to reduce the scanning latency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 31A shows the encoding of the Country/Region Index field as per the third embodiment.

FIG. 31B shows the encoding of the Operating Class & Channel Index field as per the third embodiment.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
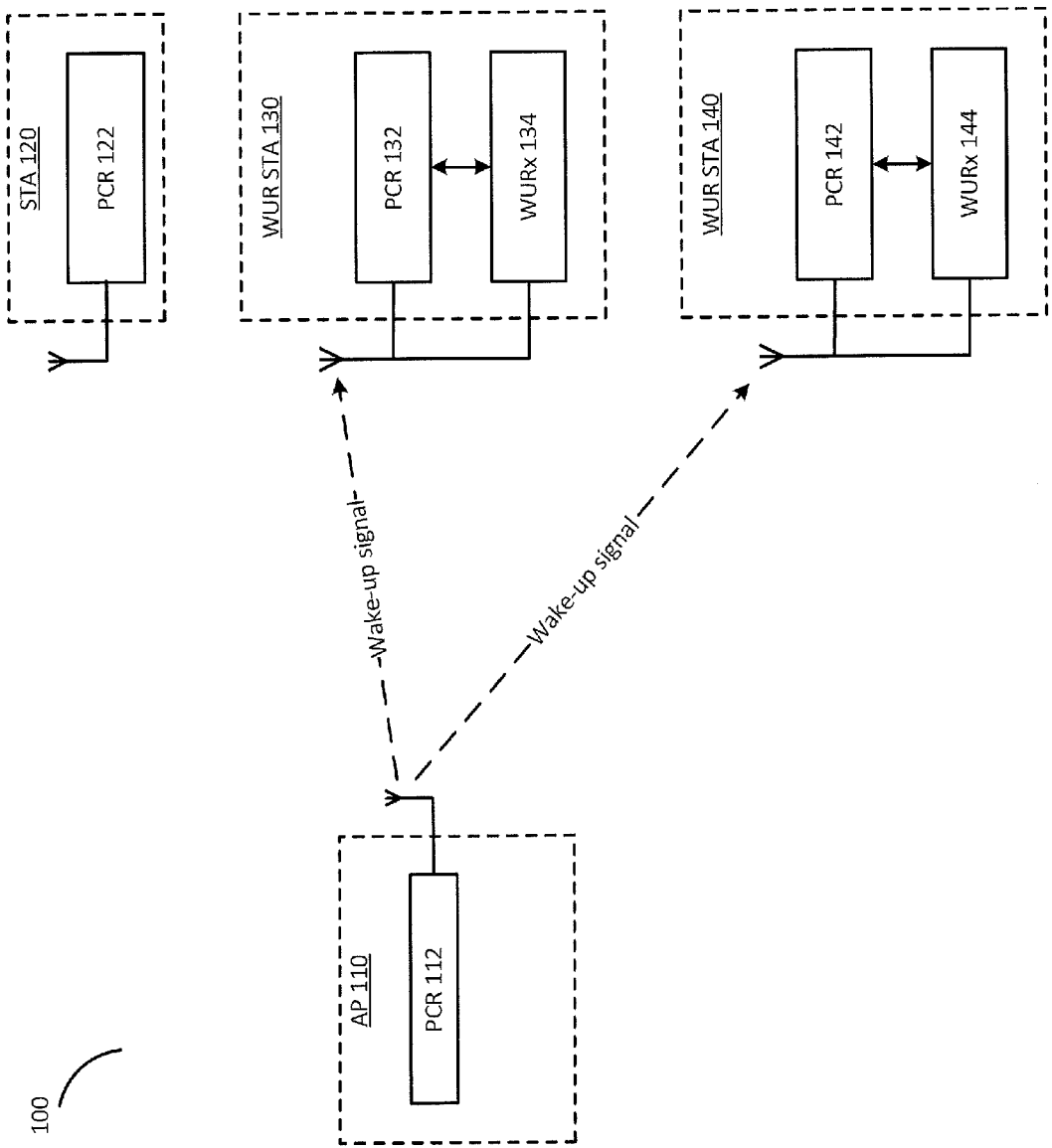
FIG. 1 shows an example heterogeneous 802.11 wireless network with a mixture of legacy 802.11 devices and WUR capable devices.

FIG. 1 shows an example of a wireless communication network 100 in which the present disclosure may be applied. The wireless communication may be based on popular wireless standards such as IEEE 802.11. The wireless communication network 100 may comprise an Access Point (AP) 110 and three stations (STA) 120, 130 and 140. The AP 110 is equipped with a Primary Connectivity Radio (PCR) apparatus (hereinafter stated simply as "PCR") 112 which is capable of transmitting and receiving wireless signals in the 802.11 waveform (e.g. Orthogonal Frequency Division Multiplexing (OFDM)) as well as being capable of transmitting wireless signals in the Wake-up radio (WUR) waveform (e.g. On-Off Keying (OOK)). STA 120 is a legacy 802.11 device that is only equipped with a PCR 122 capable of transmitting and receiving 802.11 signals whereas STAs 130 and 140 are both WUR capable STAs and are equipped with PCRs apparatus (hereinafter stated simply as "PCRs") 132 and 142 respectively as well as Wake-up radio receivers (WURx) apparatus (hereinafter stated simply as "WURx") 134 and 144 respectively. STAs 130 and 140 are capable of transmitting and receiving 802.11 signals and are also capable of receiving WUR signals. The PCRs 132 and 142 may only be turned on during active communication (PCR mode), while during period of idle listening, the PCRs may be turned off and only the WURx 134 and 144 may be operating (WUR mode). If the STAs are already associated with the AP 100, when the AP 110 needs to communicate with STAs operating in WUR mode, it may first transmit wake-up signal to instruct the STAs to transit to PCR mode by turning on the respective PCRs and switching off the WURx. Subsequently the AP and the STAs may perform communication over the PCR. Once the communication is over, the STAs may switch back to WUR mode by switching off the PCR and turning on the WURx. During idle times, the WUR STAs may also use their WURx to passively scan the WUR channels to discover new APs in the neighborhood.

Figure 2:
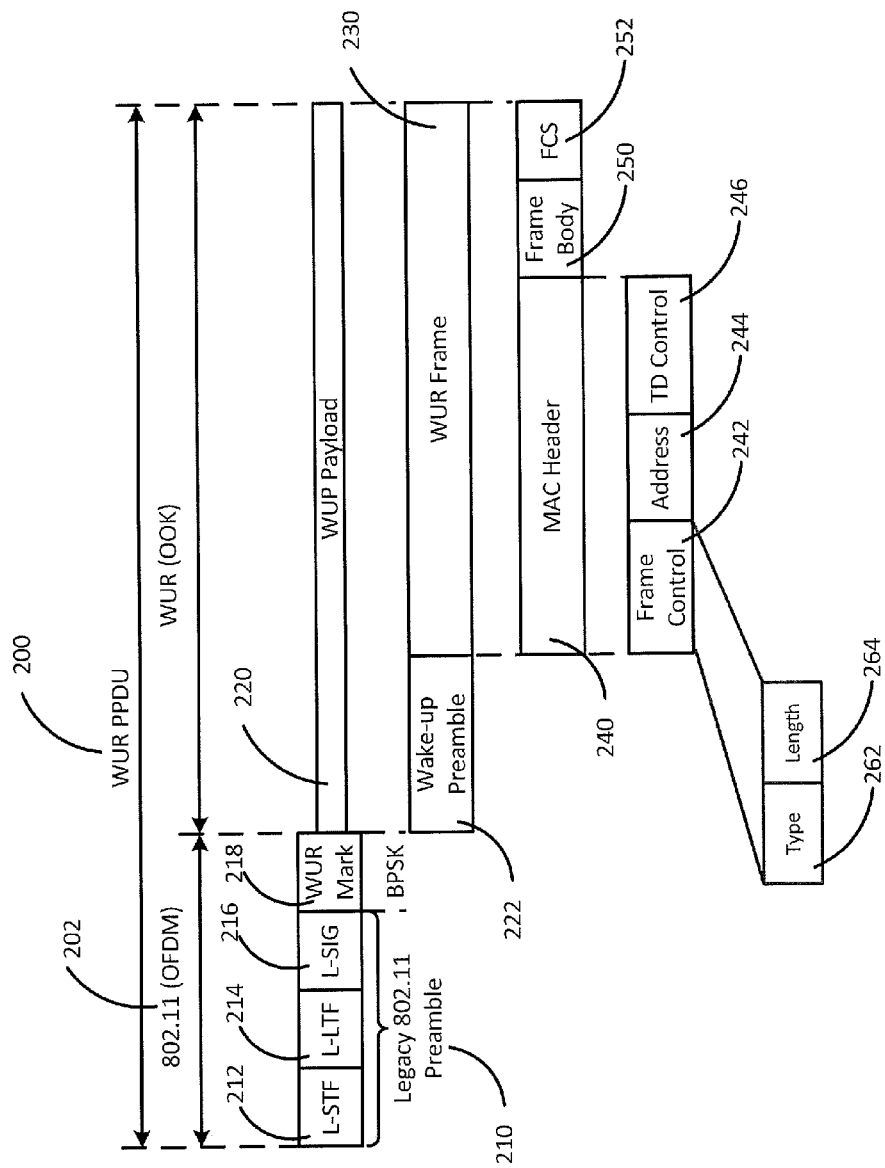
FIG. 2 shows the format of WUR PHY Protocol Data Unit (PPDU) being considered in the 802.11ba Taskgroup.

FIG. 2 shows the format of the wake-up signal being considered in the IEEE 802.11ba Taskgroup. The wake-up signal may be represented as the WUR PHY Protocol Data Unit (PPDU) 200. The WUR PPDU 200 is composed of two distinct portions. The first portion is comprised of a 20 MHz legacy (also known as non-high-throughput (HT)) 802.11 preamble 210 and one extra OFDM symbol 218 called WUR Mark, which are transmitted in the 802.11 OFDM waveform over the entire 20 MHz channel. The second portion is the wake-up packet (WUP) payload 220 which is transmitted in a WUR OOK waveform in a narrower sub-channel within the 20 MHz channel, for example a 4 MHz sub-channel. Although only a single WUP Payload 220 is shown in FIG. 2, it is also possible that more than one, for example three WUP Payloads, are transmitted on different, non-overlapping sub-channels within the 20 MHz channel.

The legacy 802.11 preamble 210 provides coexistence with legacy 802.11 STAs that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. The WUR Mark 218 of duration 4 micro-seconds modulated in Binary Phase Shift Keying (BPSK) is transmitted right after the L-SIG 216 to prevent 802.11n devices from wrongly decoding the WUR PPDU 200 as being an 802.11n packet.

The WUP Payload 220 carries the actual wake-up signal and comprises a wake-up preamble 222 and a WUR frame 230. The wake-up preamble 222 is used for automatic gain control (AGC), timing synchronization, packet detection etc., while the WUR frame 230 carries the control information. The WUR frame 230 may also be known as a WUR MAC Protocol Data Unit (MPDU) and may be further composed of various sub-fields such as a MAC header 240, a Frame check sequence (FCS) 252 as well as the optional Frame body 250. The MAC header 240 may be further comprised of a Frame control field 242 that species the frame Type 262, frame length 264 etc., an Address field 242 that may carry either one of the Transmitter Address, Receiver address or both. Other control information may be carried in the TD Control field 246 depending on the frame Type. For example in WUR beacon frames, the TD Control field 246 may carry a timestamp field, while in unicast WUR frames, the TD Control field 246 may carry a packet number etc.

Figure 3:
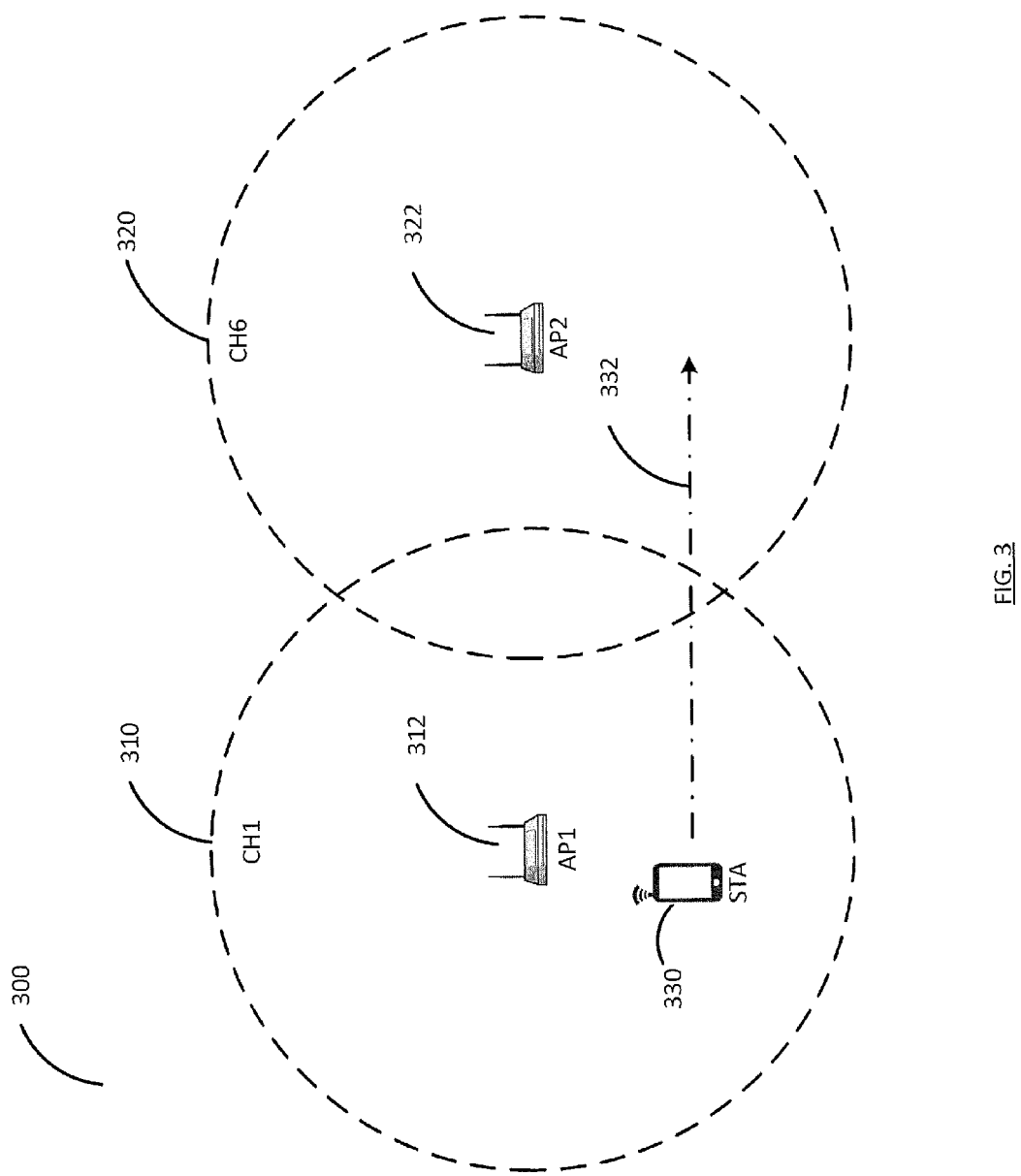
FIG. 3 shows an example roaming scenario between two wireless networks.

FIG. 3 shows an example wireless network deployment 300 with two overlapping Basic Service Set (BSS) 310 and 320, each with its own AP: AP1 312 and AP2 322 respectively. Both AP1 312 and AP2 322 are WUR capable APs, similar to AP 110 in FIG. 1 and are capable to transmitting in both 802.11 waveform (OFDM) as well as WUR waveform (OOK). BSS 310 is operating on Channel 1 while BSS 320 is operating on a non-overlapping channel 6. A WUR capable STA 330 that is currently associated with AP1 312 is shown moving along trajectory 332 towards BSS 320. STA 330 may be STA 130 in FIG. 1 and is equipped with both a PCR 132 as well as a WURx 134. As an example STA 330 may be a smartphone equipped with a WURx in addition to the normal 802.11 radio. As STA 330 moves away from AP1 310 and closer to AP2 320, the quality of its communication link with AP1 310 may start degrading, for example it may start experiencing excessing packet failures and retransmissions. Such link degradation will usually trigger roaming scan on STA 330 and it will start to scan the other channels that it is capable of operating on with the purpose of discovering alternate networks that provide better link quality than BSS 310 and AP1 312. STA 330 may perform a Passive scan i.e. passively listening to the channels and collecting Beacon frames from different APs, or it may also perform Active scan i.e. actively polling APs on each channel for Probe Responses. In either case, usually the number of channels on which a STA is capable of operating is quite big and the whole scanning and network discovery process (whether Active Scan or Passive Scan) may take quite a bit of time and this may prove to be very disruptive for the communication link. In the 2.4 GHz frequency band, there are up to fourteen 20 MHz channels and in the 5 GHz band, there are nine non-DFS (Dynamic Frequency Selection) channels. Even if it takes 100 milliseconds to scan one channel, the total scan latency is 2.3 seconds and such latency can be very disruptive for many applications. As an example, VOIP (Voice over IP) recommends latency within 150 milliseconds for a smooth call quality, whereas a typical roaming using the 802.11 radio may take a few seconds. If a user happens to be on a VOIP call while roaming, he will experience a disruption in service or in worst case even a breakdown of the call due to TCP connection loss as an example. Eventually, when the STA 330 has completed the scan process and discovered BSS 320, it can disassociate from AP1 312 and associate with AP2 322.

As an alternate scanning mechanism, a new Usage model called Smart Scanning has been recently added to the IEEE 802.11ba Usage model document. The Smart Scanning usage model envisions WUR capable STAs making use of the WUR radio to periodically perform passive scans of the channels and collecting information about neighboring APs. The collected information may be used to facilitate faster roaming in future. Due to the comparatively lower power consumption of WUR radios, Smart Scanning may be performed frequently in the background. The Smart Scanning Usage model is quite different from the other 802.11ba Usage models. Instead of using the WUR radio solely to enable wake up of the PCR, the Smart Scanning Usage envisions utilizing the WUR radio to perform background scans while the PCR is in doze state or even turned off. While the other Usage models primarily focus on power saving form main radio sleep and is targeted at battery limited devices, the Smart Scanning Usage model is intended for mainstream mobile devices such as smart phones, tablets etc. Since WUR radios are designed to be used for reception of WUR signals, normal IEEE 802.11 frames used for scans like Beacon frames or Probe Response frame cannot be used for WUR Smart Scanning. As such, a new type of WUR frame called WUR Discovery frame has been proposed to enable WUR Smart Scanning and a WUR capable AP will periodically broadcast WUR Discovery frames on WUR channels to assist in the WUR Smart Scanning.

Several exemplary embodiments are described in detail in later sections to describe the disclosure in detail. The various embodiments for reducing the scan latency as per the present disclosure are described in detail in the following sections.

First Embodiment

As explained earlier, a WUR based Smart Scanning would have definitive advantage from power consumption point of view owing to the low power consumption of WUR radio (WURx). However, considering the low data rate of WUR transmission, the transmission of WUR discovery frames by APs, which are vital for WUR Smart Scanning, may not be very frequent. This, combined with the necessity of scanning a large number of WUR channels will make the scanning process equally long, if not longer. One way of reducing the scan latency then would be to limit the transmission of WUR Discovery frames on a sub-set of WUR channels; these WUR channels may be referred to as WUR Discovery channels. Designating a single WUR channel as the sole common WUR Discovery channel to be used for transmitting WUR Discovery channel would be best from the scan latency point of view; however due to the inherent lack of predictability of a wireless channel quality just having a single WUR channel as the WUR Discovery channel is also risky. A better option may be to designate a few WUR channels as candidate WUR Discovery channels and each individual AP can choose one of the candidate channels as the operational Discovery channel for its BSS.

Figure 4:
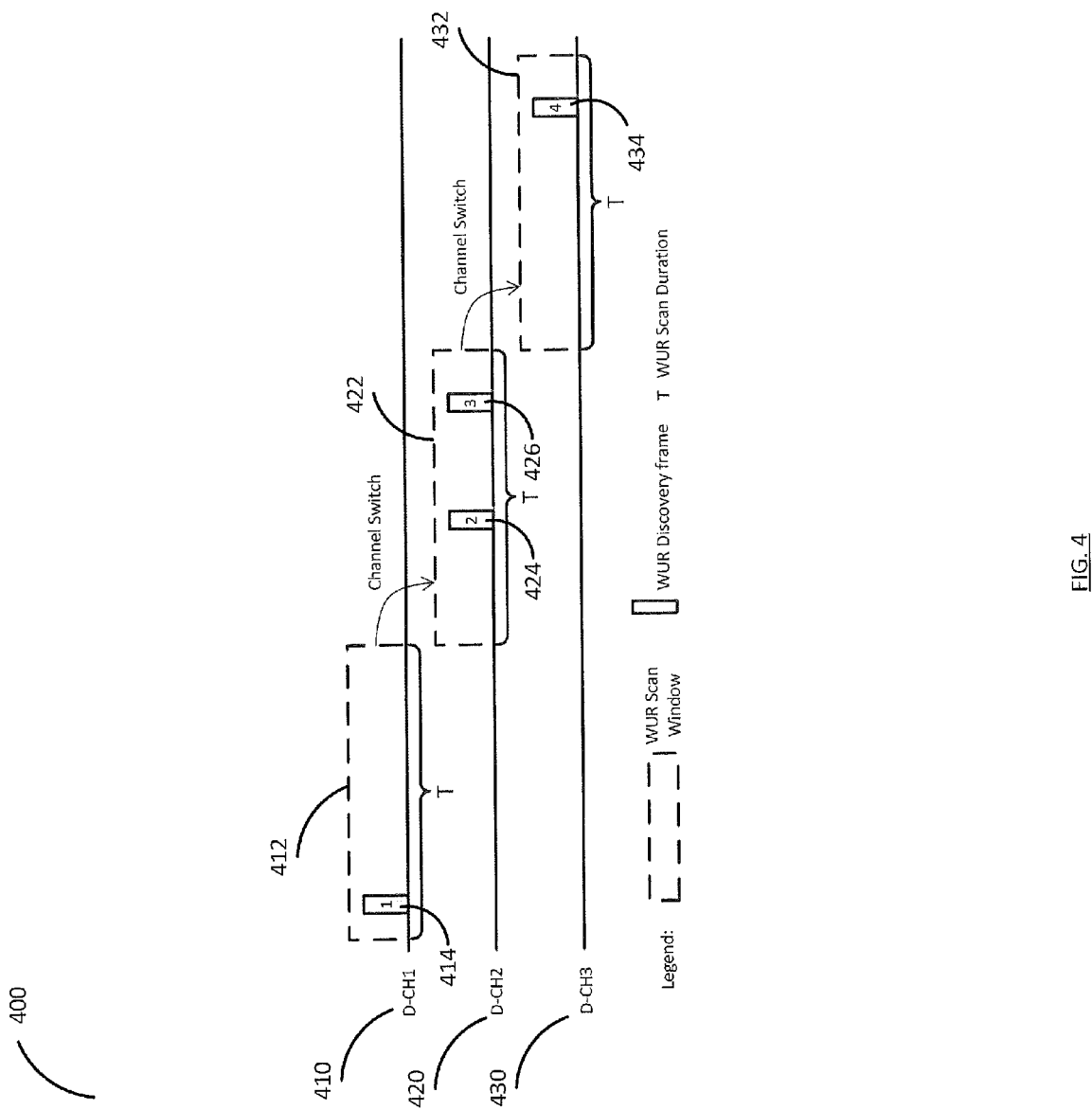
FIG. 4 shows an example of a Smart Scanning procedure using a limited number of discovery channels as per the first embodiment.
Figure 5:
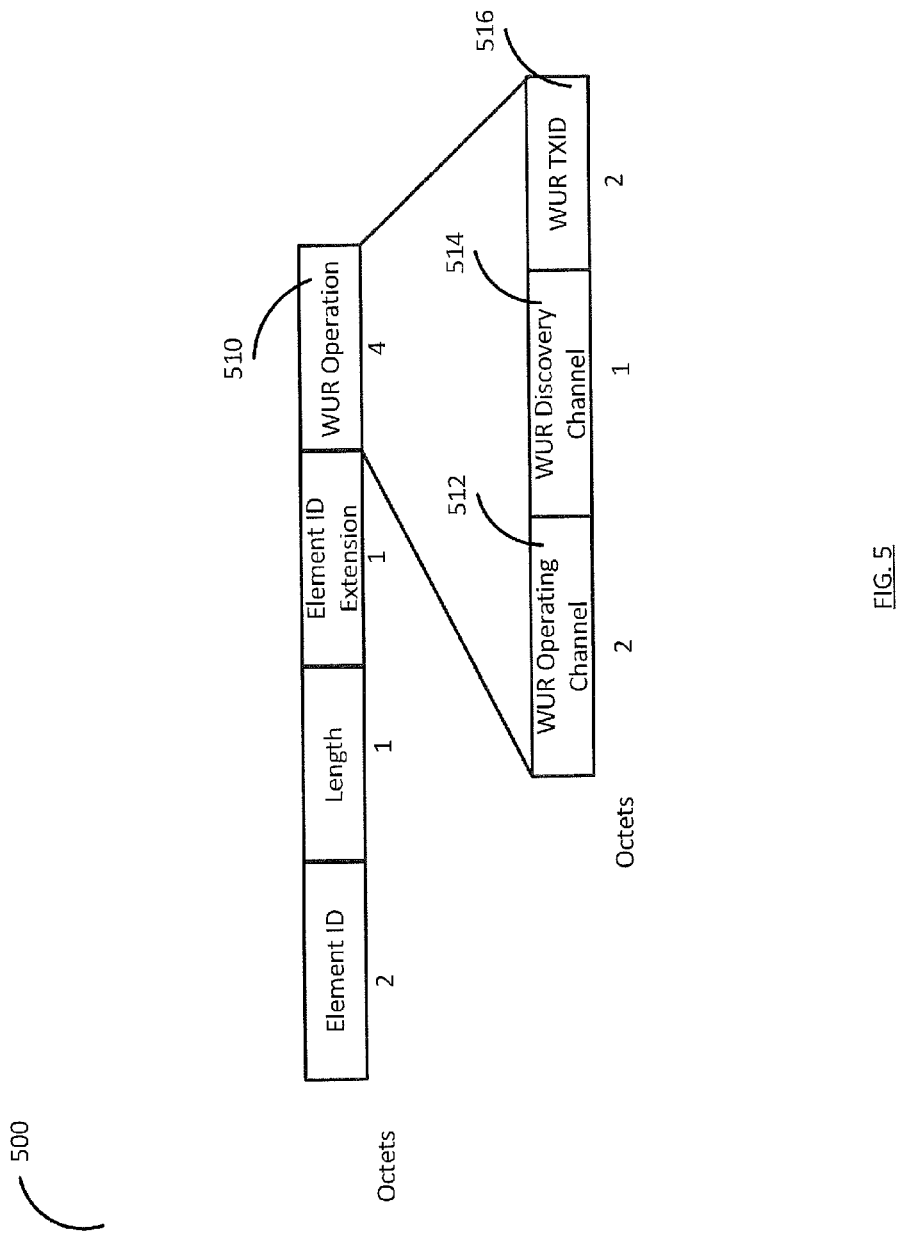
FIG. 5 shows the WUR Operation element as per the first embodiment.

FIG. 4 shows an example Smart Scanning procedure 400 when three WUR channels have been designated as Discovery channels. AP1 312 in FIG. 3 transmits its WUR Discovery frame 414 on the Discovery channel D-CH1 410 while AP2 322 transmits its WUR Discovery frame 424 on Discovery channel D-CH2 420. 426 and 434 are Discovery frames transmitted by other neighbor APs on Discovery channels D-CH2 420 and D-CH3 430 respectively. An AP may use the WUR Operation element 500 shown in FIG. 5 to advertise its WUR operation parameters. The WUR Operation field 510 may carry the WUR Operating Channel field 512 to inform the WUR channel that the AP uses to wake it member WUR STAB. The WUR Discovery Channel field 514 advertises the WUR Channel that the AP uses to broadcast its WUR Discovery frames. Finally, the WUR TXID field 516 may be used to broadcast the transmitter identifier that the AP uses as its transmit ID in the relevant WUR frames that requires a transmit ID. The WUR Operation element may be included in the 802.11 Beacon frames as well as Probe Response frames transmitted by the AP's PCR. The contents of the WUR Operation element of neighbor APs may be used by an AP when setting up its BSS to decide its own WUR Operating channel, WUR Discovery channel as well as its WUR TXID. Typically, when setting up a new BSS, in order to minimize false wakeups, an AP may gather WUR Operation elements from its neighbor APs and choose a WUR channel that is not used by its neighbor APs, as its WUR Operating channel. Similarly, the AP also chooses a TXID that is not used by any of its neighbor APs in order to avoid/minimize transmit ID collision. The choice of the WUR Discovery channel, however may be deployment dependent, for example all the APs of the same ESS (Extended Service Set) may choose to transmit their WUR Discovery frames on the same Discovery channel, while APs of a different ESS may choose a different Discovery channel. A WUR STA performing WUR Smart Scanning starts scanning D-CH1 410 and listens for WUR Discovery frames during the WUR Scan Window 412 that lasts for scan duration T which should be at least equal or slightly larger than the largest allowed time interval between two consecutive WUR Discovery frames transmitted by an AP. This is to ensure that the WUR STA receives all the WUR Discovery frames transmitted on this channel, which in example is the WUR Discovery frame 414 transmitted by AP1 312. After completing scanning of D-CH1 410, the WUR STA tunes its WURx to the second WUR Discovery channel D-CH2 420 and listens for WUR Discovery frames till the end of the WUR Scan Window 422, receiving WUR Discovery frames 424 and 426. After completing scanning of D-CH2 420, the WUR STA again tunes its WURx to the third WUR Discovery channel D-CH3 430 and listens for WUR Discovery frames till the end of the WUR Scan Window 432, receiving WUR Discovery frames 434. Upon completing the WUR Smart Scanning 400, the WUR STA may use the information collected from the four WUR Discovery frames to make a decision on the AP or the BSS to join. As explained earlier, even though limiting the number of Discovery channels to three helps to drastically reduce the number of channels to be scanned, due to the large interval between the transmission times of two consecutive WUR Discovery frames, the actual scan latency may not be much smaller than a normal 802.11 scan. As an example, if all APs transmit WUR Discovery frames at an interval of 1 second, the WUR Smart Scanning 400 will take 3 seconds, which is still very long.

Figure 6:
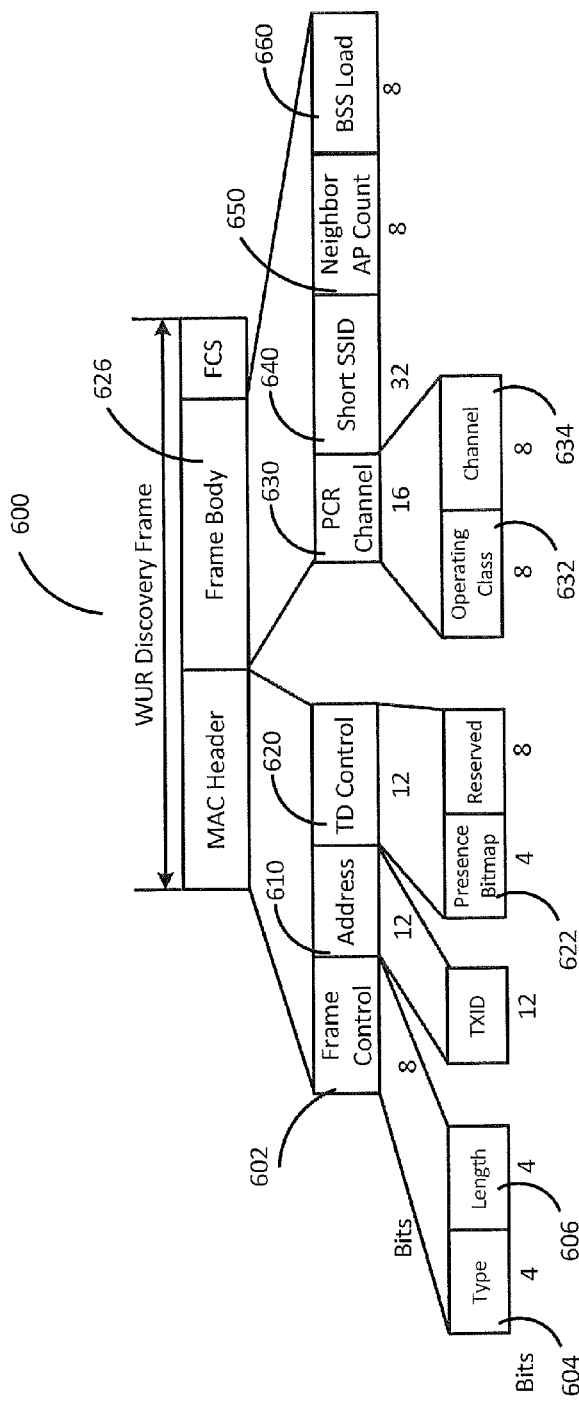
FIG. 6 shows an example WUR Discovery frame as per the first embodiment.

One reason for the comparatively large scan latency for the WUR Smart Scan 400 is the necessity of listening at least for the WUR Scan Duration T on each of the Discovery channels. For example, even though only AP1 312 transmits WUR Discovery frames 414 on Discovery channel D-CH1 410, a STA has to listen for the whole of the WUR Scan Window 412. This is due to the fact that the STA is not sure how many WUR Discovery frames to expect on the channel. If the STA had prior information that only one AP transmits WUR Discovery frames on channel D-CH1 410, upon receiving the WUR Discovery frames 414, it could have immediately switched to the next Discovery channel D-CH2. This goal can be achieved by having each WUR capable AP, include in its WUR Discovery frame, a count of the neighbor APs that also transmit WUR Discovery frame on the same Discovery channel. The format of the WUR Discovery frame 600 is shown in FIG. 6. The WUR Discovery frame 600 follows the same structure as the WUR Frame 230 in FIG. 2, with the Frame Type field 604 in the Frame Control 602 indicating a WUR Discovery frame and the Length field 606 indicating the length of the Frame Body field 626. The Address field 610 is set to the AP's transmit ID (TXID) to uniquely identify the AP that transmitted the WUR Discovery frame. WUR Discovery frames are considered Variable Length (VL) WUR frames and as such carry the optional Frame Body field 626. Since some of the sub-fields within the Frame Body field 626 may be optional, the TD Control field 620 carries a Presence Bitmap field 622 indicating the presence/absence of the various sub-fields, for example 1 indicating that a corresponding sub-field is present in the Frame Body field 626 and 0 indicating that the sub-field is absent. The PCR Channel sub-field 630 indicates the primary 20 MHz channel that the AP uses for its PCR. The Operating Class 632 field and the Channel field 634 together uniquely identify the primary 20 MHz channel. Although, it is not necessary that the WUR Discovery channel and the PCR 20 MHz primary channel of a BSS be the same, in certain situations it is possible that an AP chooses the same 20 MHz channel for both the WUR Discovery channel and the PCR 20 MHz primary channel of a BSS. In such cases, the PCR Channel sub-field 630 may be omitted from the WUR Discovery Frame 600, with its absence implicitly indicating that the 20 MHz channel on which the WUR Discovery Frame 600 is received is also the primary 20 MHz channel of the AP transmitting the Discovery frame. Alternately, one bit in the TD Control field 620 may be used to indicate this. The Frame Body may also carry a sub-field to identify the wireless network that the AP belongs to. SSID (Service Set Identifier) is popularly used to represent the ESS (Extended Service Set) that an AP belongs to. As an example, a Short SSID sub-field 640 may be carried in the Frame Body as a compact representation of the SSID. The example procedure to generate the Short SSID to from an SSID is given in (NPL 2). Alternatively the Short SSID sub-field may also carry the compressed SSID introduced in (NPL 3). The Short SSID field 640 may be used to filter APs belonging to an ESS with a known SSID. The Neighbor AP Count sub-field 650 is used by the AP to indicate the number of neighbor APs that also transmit WUR Discovery frame on the same Discovery channel. An AP may collect the information on neighbor APs in a variety of ways. For example, in a centrally managed enterprise ESS, a central controller may provide such information to each AP in the ESS. Alternatively, each AP may also gather such information on its own, for example through regular reporting from the AP's member STAs, or through the AP's own periodic off channel scans etc. The WUR Discovery Channel field 514 carried in the WUR Operation element 500 in FIG. 5 may be used by an AP to tabulate the count of neighbor APs that also transmit WUR Discovery frame on the same Discovery channel as itself. The BSS Load field 660 may be used as a representative indication of the overall load on a particular BSS. Although various parameters such as Channel utilization, number of STAs associated with the AP are typically used to represent the load of a BSS, due to the length limitation, it is not practical to include all of them in the WUR Discovery frame. However, the BSS Load field 660 may represent a rough indication of the current load on a BSS, for example a low value (less than 50) may represent a lightly loaded BSS, while a high value (more than 200) may represent a heavily loaded BSS etc.

Figure 7:
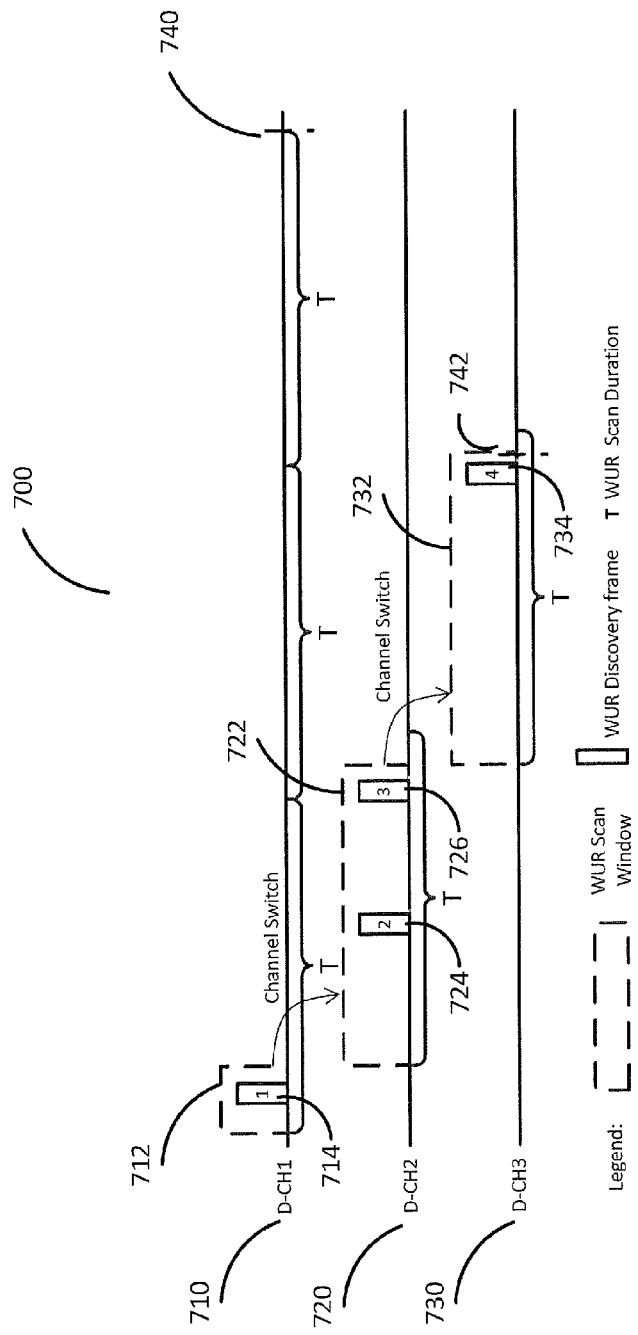
FIG. 7 shows an example of a Fast Smart Scanning procedure using a limited number of discovery channels as per the first embodiment.

Smart Scanning that take advantage of the information of the neighbor AP count to cut down the scan latency may be referred to as Fast Smart Scanning. FIG. 7 shows an example Fast Smart Scanning procedure 700 for the same example used in FIG. 4. The WUR Discovery frame 714 is the only Discovery frame transmitted on the Discovery channel D-CH1 710 and as such the Neighbor AP Count sub-field 650 of the WUR Discovery frame 714 indicates 0. A WUR STA that receives the WUR Discovery frame 714, saves the relevant information regarding the transmitting AP. At the same time, through the content of the Neighbor AP Count sub-field 650, the STA is informed that no other WUR Discovery frames are expected on the Discovery Channel D-CH1 710. As such, the STA need not continue scanning on D-CH1 710 till the end of the WUR Scan Duration but may cut short the WUR Scan window 712 and immediately switch to the Discovery channel D-CH2 720 and start the WUR Scan window 722. Upon receiving the WUR Discovery frame 724, the STA refers to the Neighbor AP Count sub-field 650 of the WUR Discovery frame 724 which indicates 1 indicating that one more WUR Discovery frame is expected on D-CH2 720. As such the STA continues to listen on the channel and receives the WUR Discovery frame 726. The Neighbor AP Count sub-field 650 of the WUR Discovery frame 726 also indicates 1, and since the STA has already received one more WUR Discovery frame 724, it may cut short the WUR Scan window 722 and immediately switch to the Discovery channel D-CH3 730 and start the WUR Scan window 732. Upon receiving the WUR Discovery frame 734, the STA refers to the Neighbor AP Count sub-field 650 of the WUR Discovery frame 734 which indicates 0 indicating that no more WUR Discovery frames are expected on D-CH3 730. Since D-CH3 730 is the last WUR Discovery channel on the scan list, the STA may cut short the WUR Scan window 732 and end the Fast Smart Scanning procedure 700 at time 742 which is considerably sooner than the end time 740 of the original Smart Scanning procedure.

An alternate format of the WUR Discovery frame 800 is shown in FIG. 6. Instead of placing the Neighbor AP Count sub-field 814 in the optional Frame Body, it may be carried in the TD Control field 810 instead. This will not only make the WUR Discovery frame 800 shorter in length, but in situations where the other sub-fields of the Frame Body are not present, the entire Frame Body may be omitted from the WUR Discovery frame 800 resulting in a very compact frame. This scenario is very probable in an enterprise network for example, where a STA may already be aware of other APs in the neighborhood through neighbor reports provided by its current AP. In some other usage scenario however, the various sub-fields of the Frame Body may still be required. With the popularization of IEEE 802.11u amendment through the Wi-Fi Alliance's Hotspot 2.0 program, it is increasingly common for multiple external service providers or SSPN (Subscriber Service Provider Network) to be advertised using a single SSID. In addition, groups of Service providers may form roaming consortium and have roaming agreements with one another to provide roaming services to each other's clients. Roaming consortiums are identified by an Organization Identifier (OI) that is assigned by the IEEE. An OI is often 24 bits in length, but may be 36 bits as well (OUI-36). OIs are globally unique and identify an operator, manufacturer or other organizations. In such case, it may be more useful for a STA to discover APs that provide access to a Roaming Consortium. As such the OI sub-field 820, which may carry either the 24 bits or the 36 bits OI representing the Roaming Consortium accessible through the AP, may be used as the wireless network identifier instead of the Short SSID field 640 in FIG. 6. The OI Length bit 812 in the TD Control field may be used to differentiate the 24 bits or the 36 bits OI.

Figure 8:
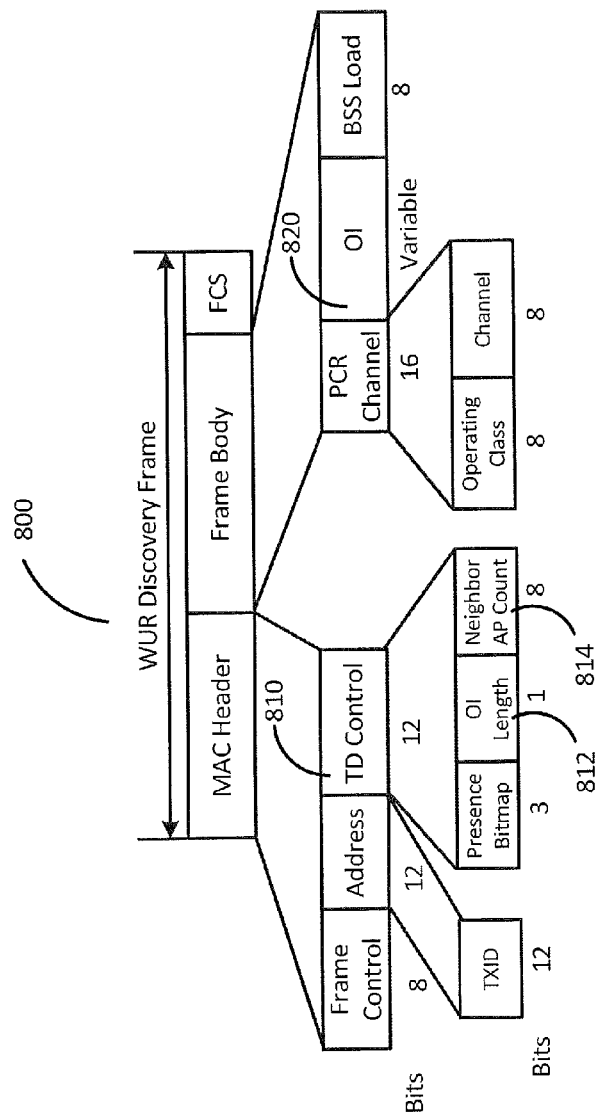
FIG. 8 shows another example WUR Discovery frame as per the first embodiment.
Figure 9:
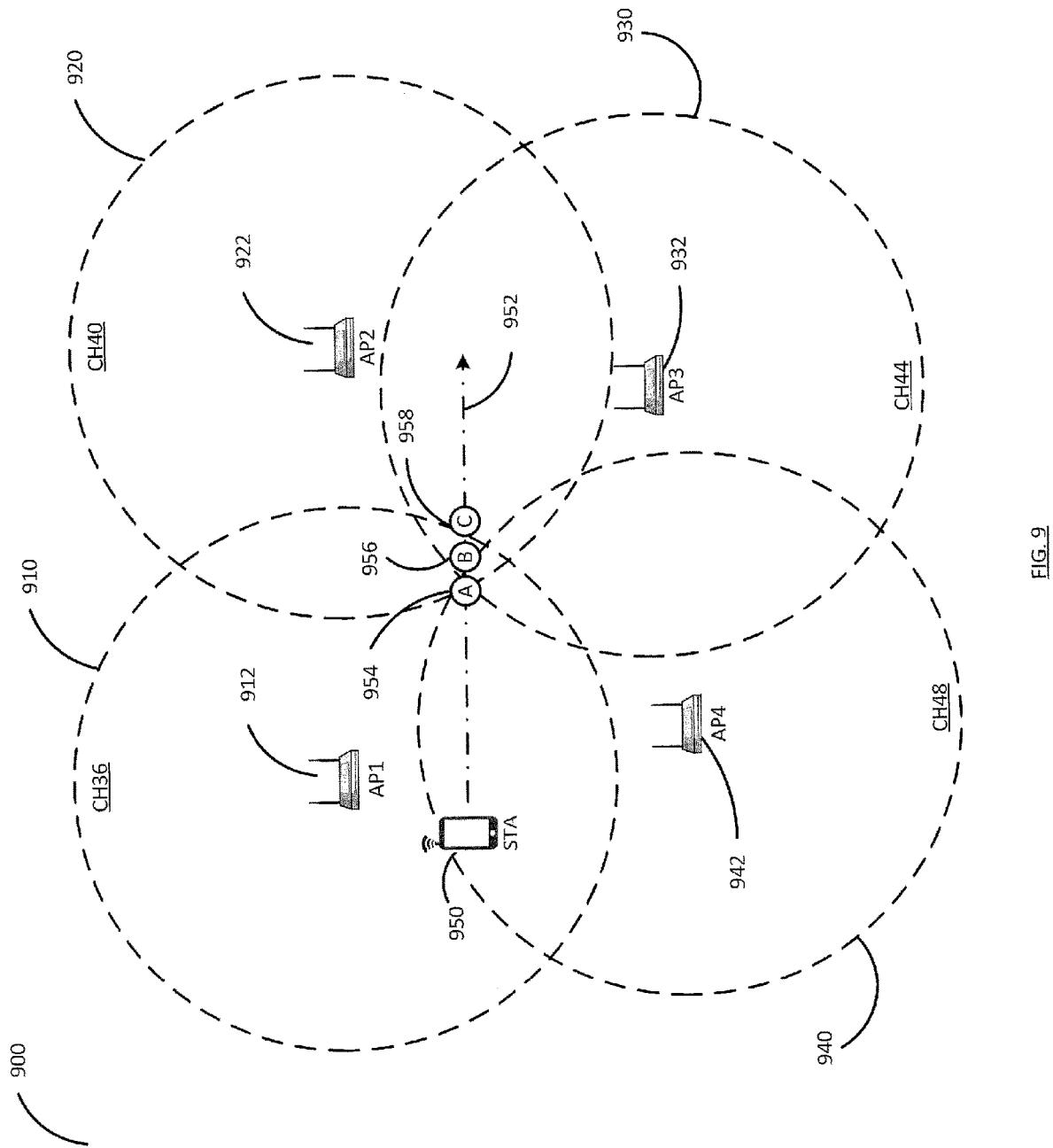
FIG. 9 shows an example roaming scenario that may take advantage of the Fast Smart Scanning procedure as per the first embodiment.
Figure 10:
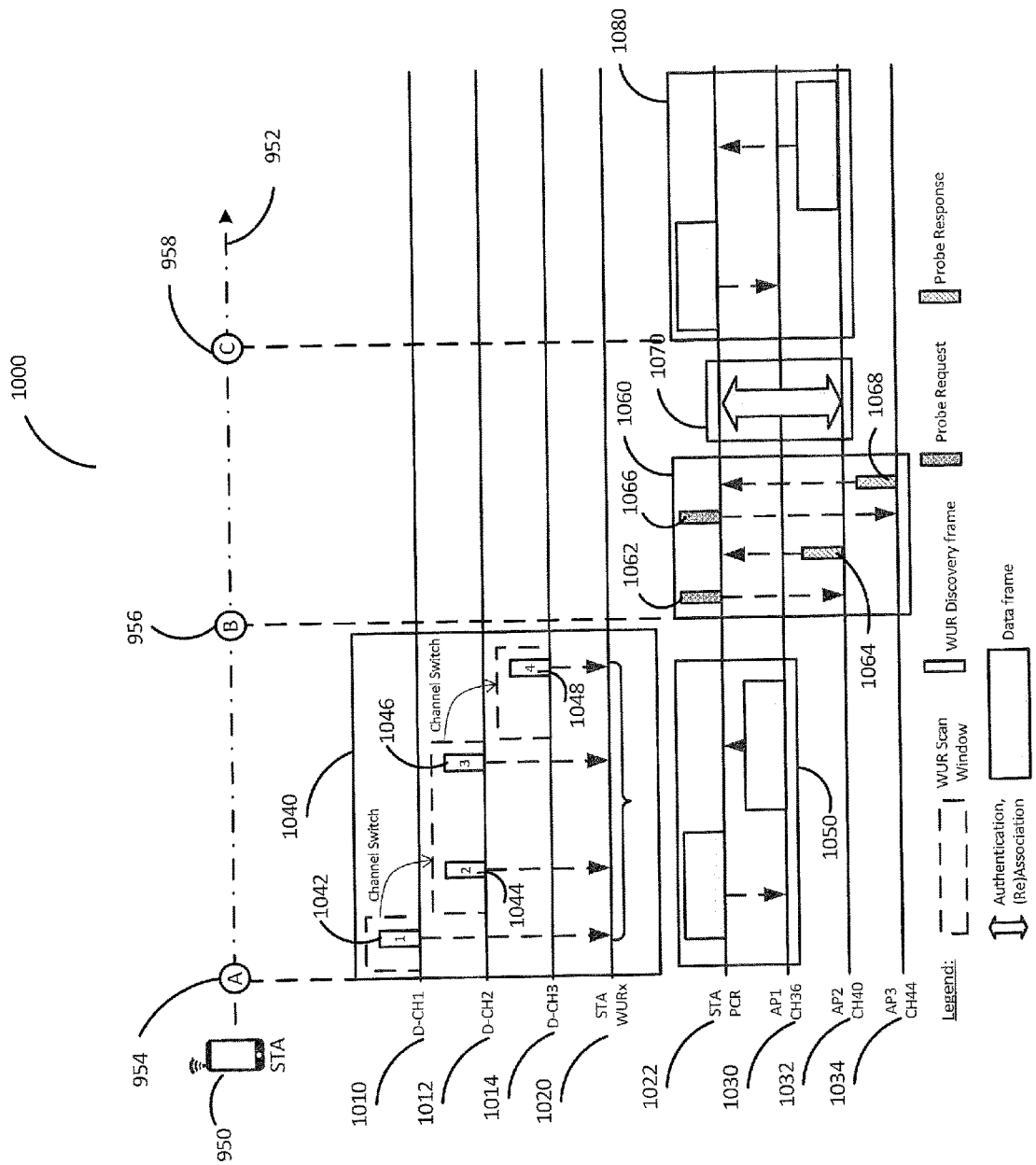
FIG. 10 shows the time domain view of the example roaming scenario of FIG. 9.
Figure 14:
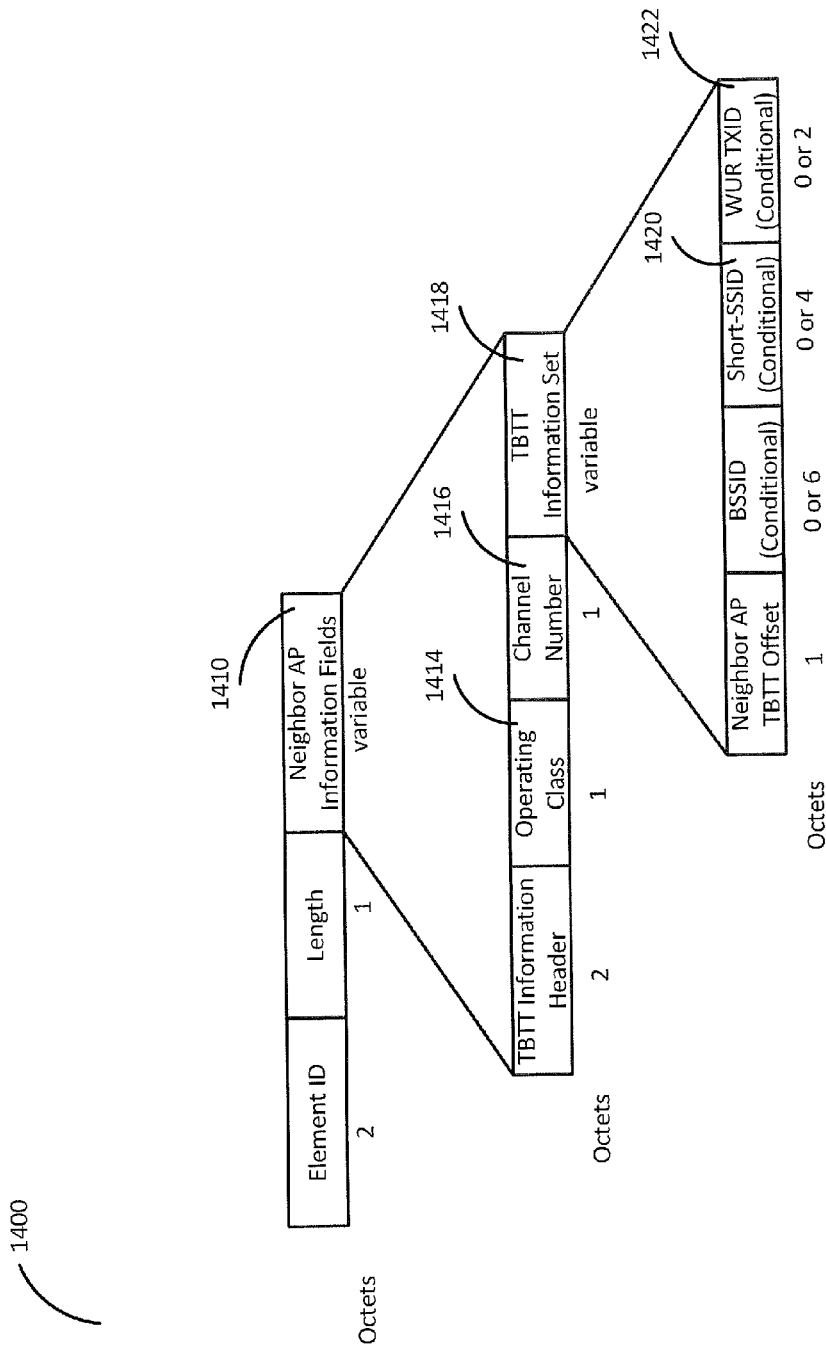
FIG. 14 shows the Reduced Neighbor Report element as per the first embodiment.

FIG. 9 shows an example roaming scenario 900 in which the disclosed Fast Smart Scanning may be used by a STA to perform faster roaming. The scenario shows four BSSs: BSS 910, BSS 920, BSS 930 and BSS 940, with their respective APs AP1 912, AP2 922, AP3 932 and AP4 942 operating on the primary 20 MHz channels CH36, CH40, CH44 and CH48 respectively. BSS 910, BSS 920 and BSS 930 together form ESS1 while BSS 940 is part of ESS2; both ESSs being part of a managed network such as an enterprise network. STA 950 (which may be STA 130 (a WUR capable smartphone) in FIG. 1), is shown to be moving along the trajectory 952, away from its BSS 910 and towards BSS 920. If the STA 950 happened to be engaged in an ongoing data communication with AP1 912 over its PCR 132 (for example in a VOIP call), at point A 954, STA 950 may notice a big change in its reception quality from AP1 912, for example a sharp fall in its MCS (Modulation and Coding Scheme) or a sharp increase in the number of packet failures and retransmission. This may trigger STA 950 to start the Fast Smart Scanning procedure, whereby STA 950 activates its WURx 134 to scan for WUR Discovery frames from neighboring APs. Alternatively, if STA 950 had its PCR 132 in doze state or turned off during this period, STA 950 may also use the drop in the reception quality of some regularly broadcasted WUR frames from its AP, for example WUR Beacons, as a trigger to start the Fast Smart Scanning procedure. The scenario 900 is better explained using the time domain sequence 1000 in FIG. 10. At point A 954, STA 950 initiates the Fast Smart Scan procedure 1040. At this time, if the STA 950 has the hardware capability to do so, it may continue the data exchange 1050 over its PCR 132, or it may turn the PCR 132 off otherwise. In this example, AP1 912 transmits its WUR Discovery frame 1042 on Discovery Channel D-CH1 1010, AP2 922 and AP3 932 transmit their respective WUR Discovery frames 1044 and 1046 on Discovery Channel D-CH2 1012, and AP4 934 transmits its WUR Discovery frame 1048 on Discovery Channel D-CH3 1014. The WUR Discovery frames may use the frame format 600 in FIG. 6 or the frame format 800 in FIG. 8. Since this is an enterprise network scenario, it is also possible that AP1 912 has already provided the STA 950 a report of the neighboring APs. The Reduced Neighbor Report element 1400 in FIG. 14 carried in Beacon frames, Probe Response frames or FILS (Fast Initial Link Setup) discovery frames may be used for such purpose. The Reduced Neighbor Report element 1400 contains one or more Neighbor AP Information fields 1410, each field providing information on one or more neighbor APs. The Operating Class field 1414 and the Channel Number field 1416 together informs the primary channel of the neighbor BSS, while the TBTT Information Set 1418 contains information on one or more neighbor APs operating on this channel. Aside from information such as TBTT (Target Beacon Transmission Time), BSSID and Short-SSID, as per the current disclosure the TBTT Information Set may also carry the WUR TXID field 1422 to inform the TXID (transmit ID) used by the neighbor AP in its relevant WUR frames. In such centrally controlled networks, it is possible to omit the PCR Channel field and the network identifier (Short-SSID field or OI field) from the WUR Discovery frame since the same information may be retrieved by cross referencing the WUR TXID field in the WUR Discovery frame with the corresponding neighbor report.

At the end of the Fast Smart Scanning procedure 1040, STA 950 would have received all four WUR Discovery frames and based on their contents along with cross referencing to neighbor report if needed, STA 950 can shortlist a few APs of interest. For example, based on the ESS1's SSID (converted to Short-SSID), STA 950 may shortlist AP2 922 and AP3 932 as the two candidate APs for roaming. STA 950 may also use additional information to make the shortlisting decision, for example the RSSI (Receive Signal Strength Indicator) of the WUR Discovery frames. At point B 956, STA 950 extracts the necessary information such as each AP's primary PCR channel from the received WUR Discovery frames and uses its PCR 132 to initiate the Active Scan procedure 1060 and sends out Probe Request frames 1062 and 1066 to AP2 922 and AP3 932 on channels CH40 1032 and CH44 1034 respectively. Since STA 950 is interested in joining a BSS belonging to its current ESS i.e. ESS1, it sets the SSID field of the Probe Request frames 1062 and 1066 to the SSID of ESS1 and subsequently receives Probe Response frames 1064 and 1068 from AP2 922 and AP3 932 respectively. Since a Probe Response frame can carry much more information compared to the WUR Discovery frame, STA 950 chooses AP2 922 as its preferred AP for roaming, for example based on the BSS load information carried in the Probe Response frames 1064 and 1068 and performs the link setup procedure 1070 with AP2 922 (Authentication, Association). At point C 958, before losing the communication link with AP1 912, STA 950 is able to start the data exchange 1080 with AP2 922 over its PCR 132. It can be seen that performing the WUR Fast Smart Scan 1040 in the background and being able to shortlist candidate APs, may significantly cut down the time required for the Active Scan procedure 1060 and enable fast roaming.

Figure 11:
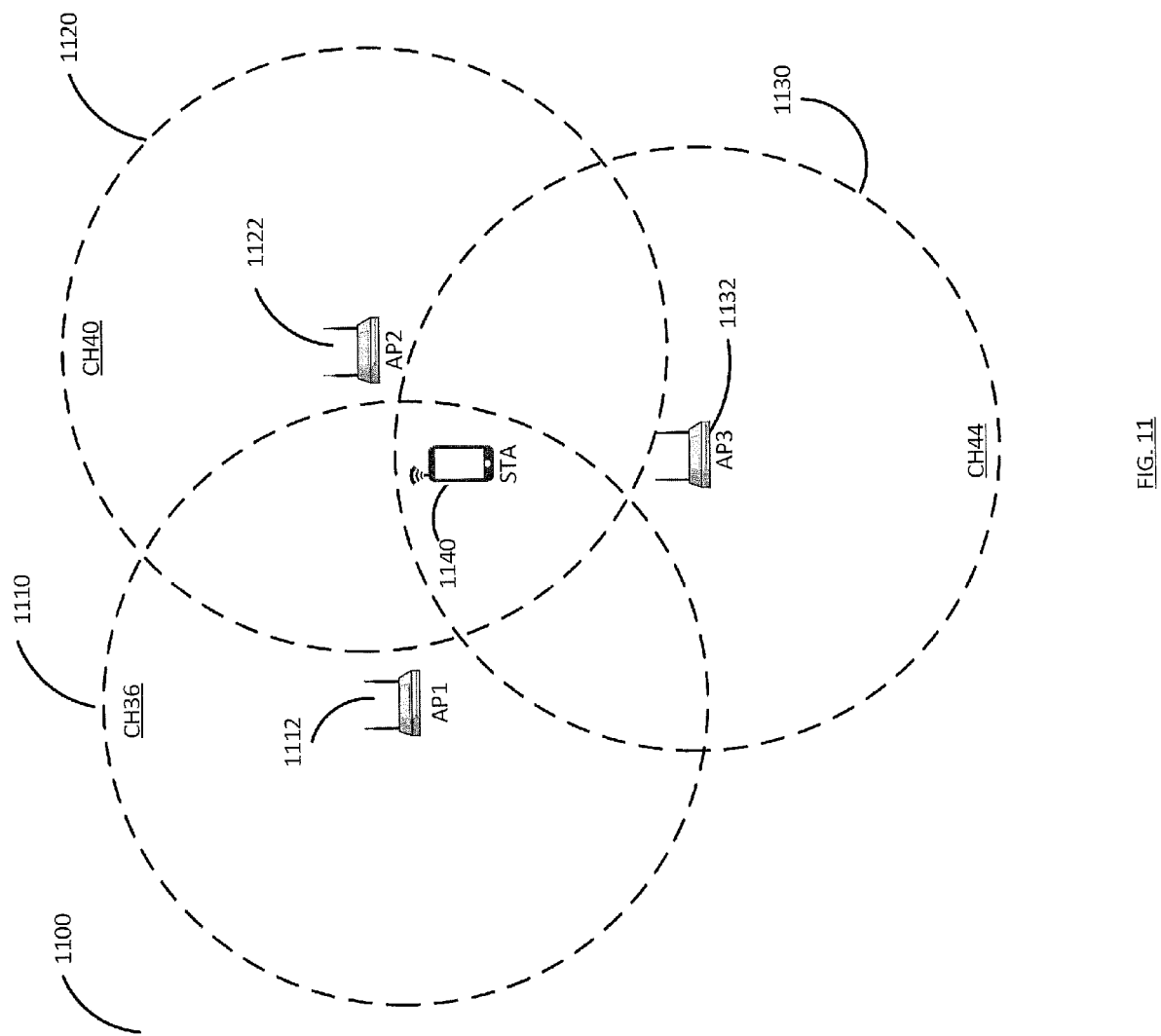
FIG. 11 shows another example roaming scenario that may take advantage of the Fast Smart Scanning procedure as per the first embodiment.
Figure 12:
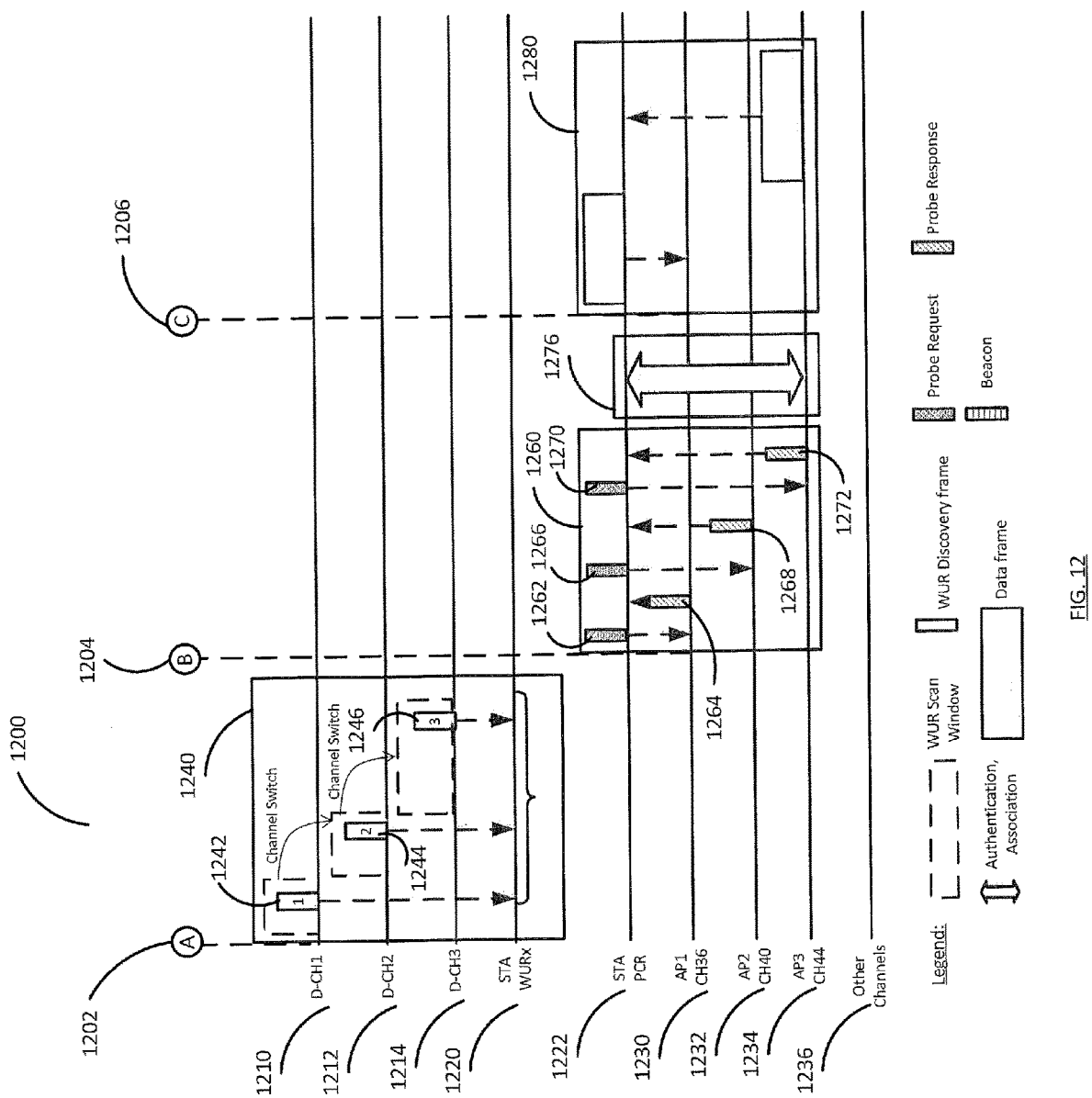
FIG. 12 shows the time domain view of the example roaming scenario of FIG. 11.
Figure 15:
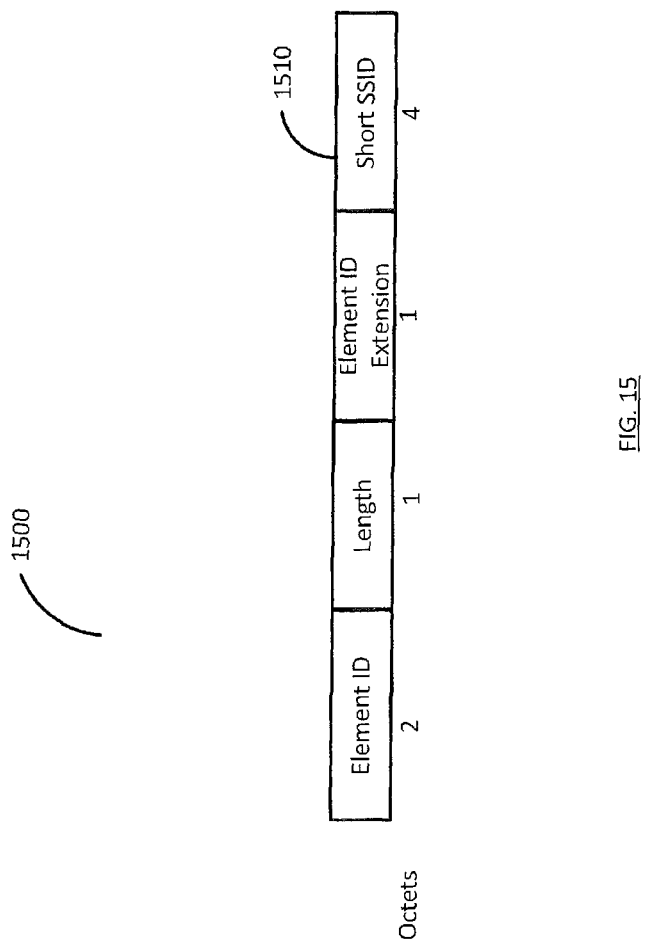
FIG. 15 shows the Short SSID element as per the first embodiment.
Figure 16:
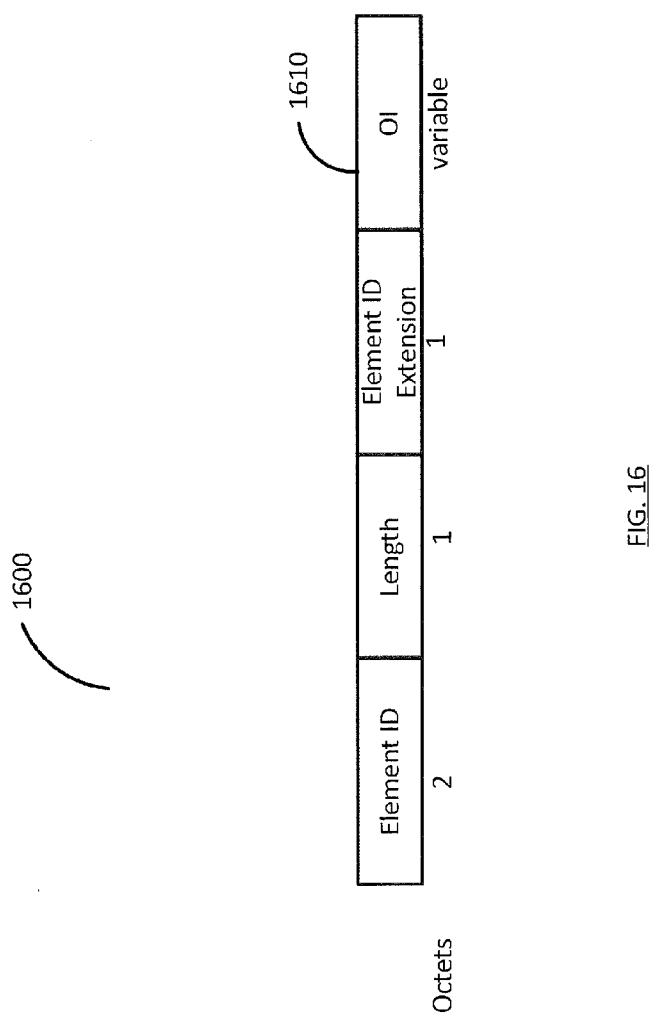
FIG. 16 shows the Organization Identify (OI) element as per the first embodiment.

FIG. 11 shows another example scenario 1100 in which the disclosed Fast Smart Scanning may be used by a STA 1140 to perform faster initial link setup or roaming. The scenario shows three overlapping BSSs: BSS 1110, BSS 1120 and BSS 1130, with their respective APs AP1 1112, AP2 1122 and AP3 1132 operating on primary 20 MHz channels on CH36, CH40 and CH44 respectively. The three BSSs may be Hotspot networks belonging to different service providers. STA 1140 (which may be a WUR capable smartphone 130 in FIG. 1) may be using a cellular connection and may not be connected to any of the APs and may have its PCR 132 in doze mode or even turned off to save power. This scenario is better explained using the time domain sequence 1200 in FIG. 12. In this scenario, STA 1140 may be performing periodic WUR Fast Smart Scan in order to discover a WLAN hotspot provided by its cellular provider, to which it can offload some or all of its data communication. As an example, at time A 1202, STA 1140 initiates the Fast Smart Scan procedure 1240 and collects the three WUR Discovery frames 1242, 1244 and 1246 transmitted by AP1 1112, AP2 1122 and AP3 1132 respectively. The WUR Discovery frames may use the frame format 800 in FIG. 8 and each AP advertises the Organization Identifier (OI) of the Roaming Consortium that may be accessed through the AP. Alternatively, The WUR Discovery frames may use the frame format 600 in FIG. 6 and each AP advertises the Short-SSID of its' hotspot. In this scenario 1200, since the three BSSs may belong to different hotspots, it may be harder for the APs to compile a neighbor report and the APs may not provide neighbor reports. In addition, STA 1140 may not have prior knowledge of the wireless identifier (either OI or SSID) of its cellular provider's WLAN hotspot, making it harder for the STA 1140 to shortlist candidate APs just based on the contents of the WUR Discovery frames. Consequently at time B 1204, the STA 1140 may initiate Active Scan procedure 1260 and sends out Probe Request frames 1262, 1266 and 1270 on channels CH36 1230, CH40 1232 and CH44 1234 respectively. In order to limit the responses only from the APs that it has received the WUR Discovery frames, STA 1140 may include either the Short SSID element 1500 in FIG. 15 carrying the Short-SSID of interest or the OI element 1600 in FIG. 16 carrying the OI of interest in the Probe Request frames 1262, 1266 and 1270. APs that receive the Probe Request frames may perform further filtering based on the Short SSID element 1500 or the OI element 1600 carried in the Probe Request frame when deciding whether or not to send back a Probe Response frames, only transmitting a Probe Response frame in response to a Probe Request frame carrying a Short-SSID or OI that is accessible through the AP. This will help to cut down the number of Probe Responses generated by APs. Subsequently STA 1140 receives Probe Response frames 1264, 1268 and 1272 from AP1 1112, AP2 1122 and AP3 1132 respectively and selects AP3 based on the received Probe Response frames. STA 1140 then proceeds to perform the link setup procedure with AP3 1132 and by time C 1206, it will be able to offload the data communication 1280 to the WLAN network.

Figure 13:
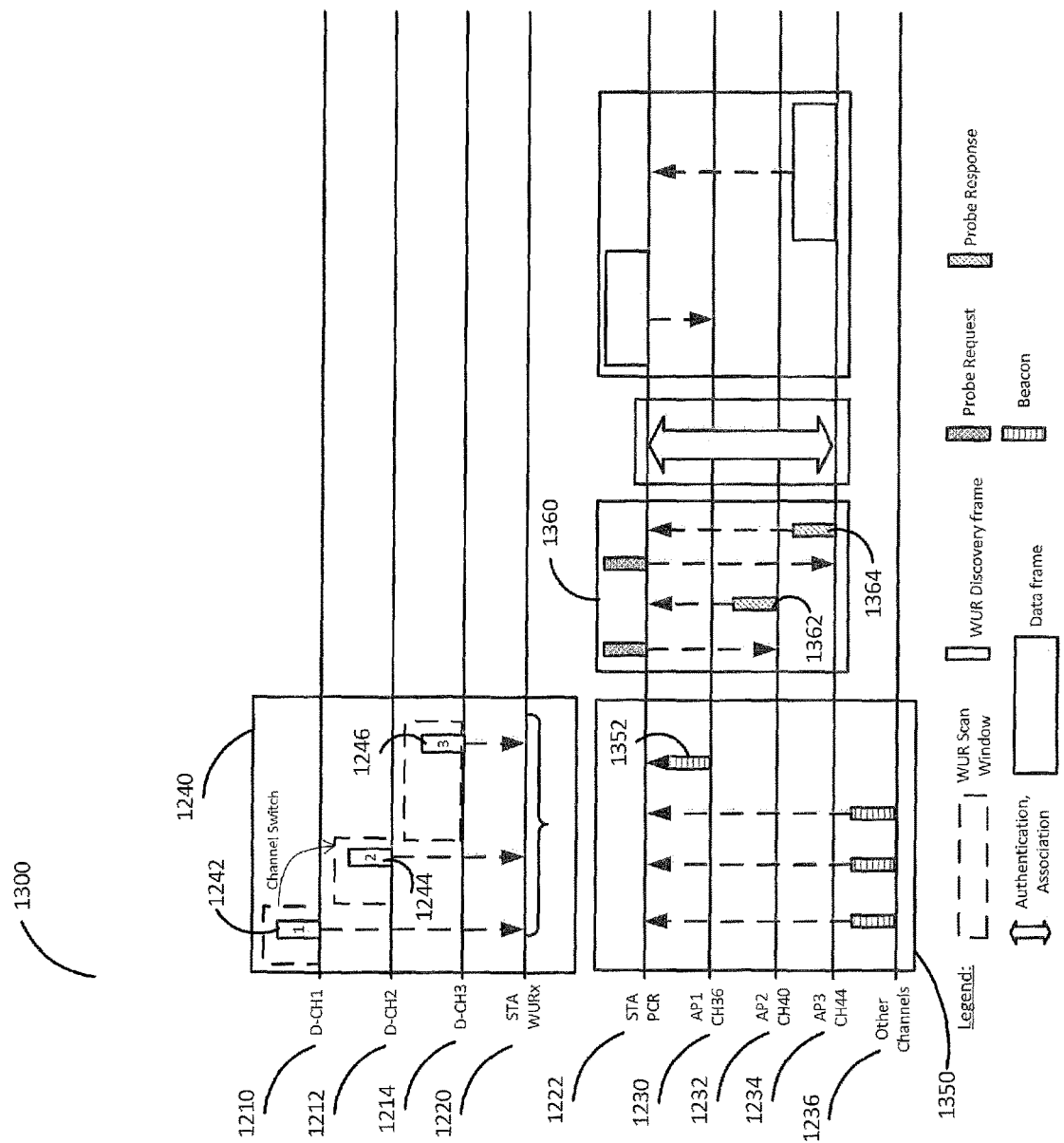
FIG. 13 shows the time domain view of an alternate procedure for the example roaming scenario of FIG. 11.

FIG. 13 shows a slightly different time domain sequence 1300 of the example scenario 1100. The Fast Smart Scan procedure 1240 is the same as in FIG. 12, however if the STA 1140 has the hardware capability to simultaneously receive on both the PCR 132 and the WURx 134, during this time, STA 1140 may also use the PCR 132 to perform a PCR passive scan 1350 on channels other than the three WUR Discovery channels. During this time it may collect Beacon frames from other neighbor APs including APs that may not transmit WUR Discovery frames, and may also receive Beacon frame 1352 from AP1 1112. Having already received Beacon frame from AP1 1112, STA 1140 can skip AP1 1112 during the subsequent PCR Active Scan 1360 and only probe AP2 1122 and AP3 1132. Upon receiving the Probe Response frames 1362 and 1364 from AP2 1122 and AP3 1132 respectively, STA 1140 may use the information collected from the Probe Response frames as well as the Beacon frame 1352 to make its selection of the AP to initiate the link setup.

Figure 17:
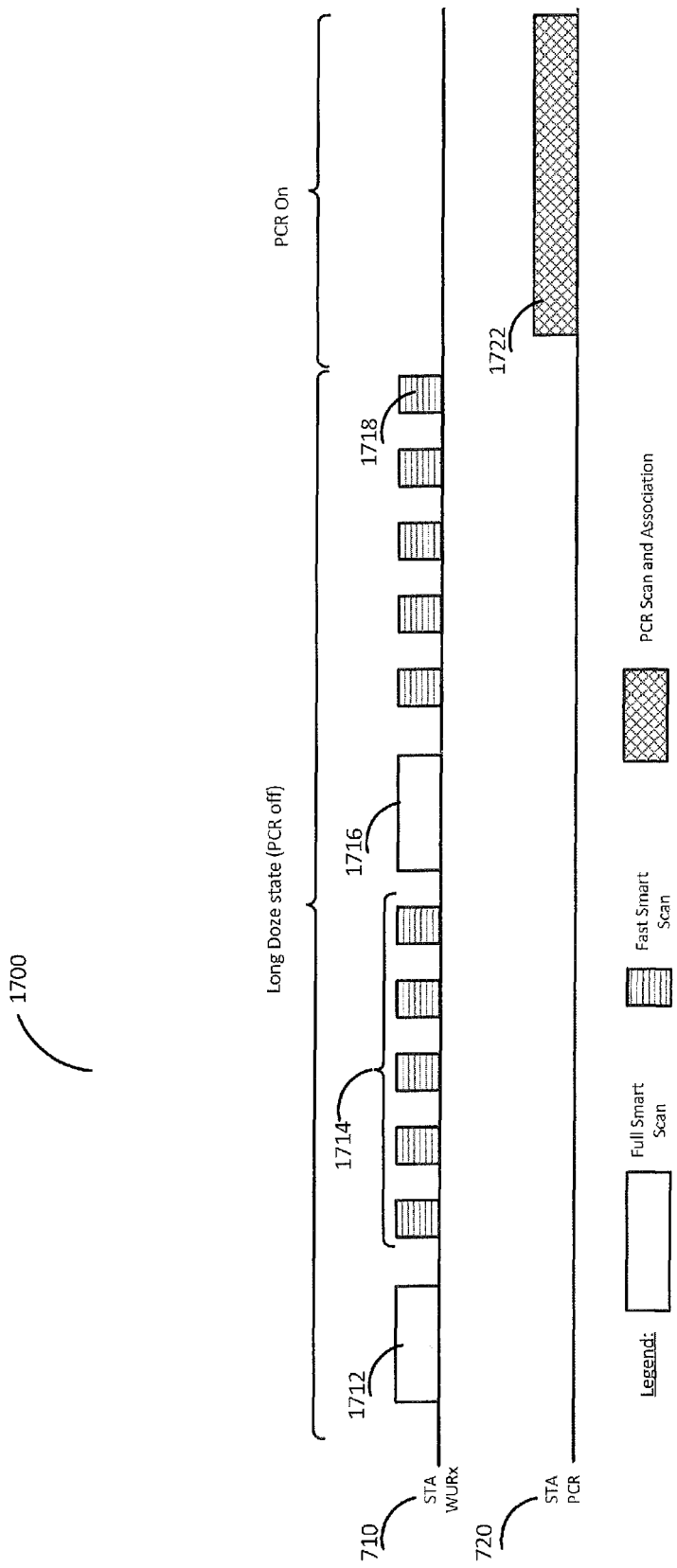
FIG. 17 shows an example of using the Fast Smart Scan along with the Full Smart Scan.

Earlier it was mentioned that in unmanaged wireless networks such as network 1100 depicted in FIG. 11 it may be difficult for STA 1140 to obtain network reports from the APs. In addition, in order to save power a typical WUR STA may stay in a very long Doze state i.e. with its PCR on Doze or even turned off for extended periods of time. During such long Doze state, even if the STA had previously received a neighbor report from its AP, the report may have become obsolete. An alternate procedure 1700 for STA 1140 to compile a neighbor report solely based on Smart Scans is shown in FIG. 17. During the background scan using its WURx, STA 1140 may occasionally perform a full Smart Scan 400 in FIG. 4 while performing the Fast Smart Scan 700 rest of the time. For example, a Full Smart Scan may be performed after every five Fast Smart Scan. In the absence of a proper neighbor report from the APs, the full Smart Scan 1712 and 1716 may be used to compile a simplified neighbor AP report. For example during a Full Smart Scan 1712, STA 1140 may record the count, Short-SSID and TXID of APs transmitting WUR Discovery frames on each of the WUR Discovery channels. Subsequently, even if the WUR Discovery frames do not include the Neighbor AP Count field 650 in FIG. 6 or 814 in FIG. 8, the neighbor AP count compiled during the Full Smart Scan 1712 may be used by STA 1140 to perform a series of Fast Smart Scans 1714. STA 1140 may continually perform this procedure in the background, until it manages to receive a WUR Discovery frame from a known AP during the Fast Smart Scan 1718, following which it can turn on its PCR and initiate the PCR Scan and link setup procedure 1722.

Figure 18:
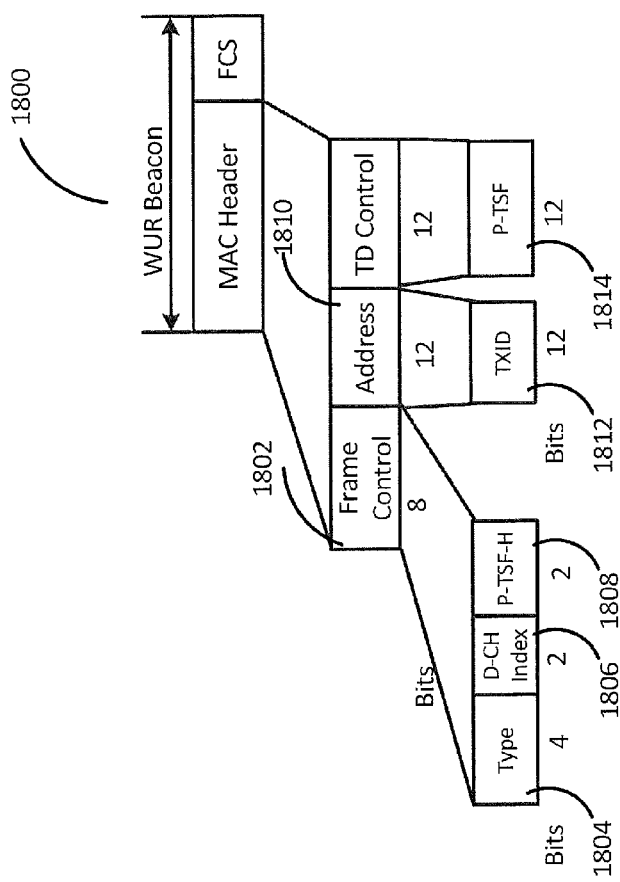
FIG. 18 shows the frame format of the WUR Beacon as per the first embodiment.

Even though so far we have focus on the use of WUR Discovery frames during the Smart Scan procedure, it may happen that while a WUR STA is performing a Smart Scan, it may also receive other broadcast WUR frame such as a WUR Beacon frame. While the primary purpose of a WUR Beacon frame is envisioned to be for maintaining the clock synchronization of an associated WUR STA with the clock of its AP, WUR Beacon frames may also be used to expedite the Smart Scan procedure as well as to help in the compilation of the neighbor AP reports during the long Doze state. The frame format of a WUR Beacon 1800 is shown in FIG. 18. WUR Beacons are considered as broadcast WUR frames and follow the general packet format shown in FIG. 2. The Type field 1804 of the Frame Control field 1802 indicates a WUR Beacon. However, since WUR Beacons are considered a CL (Constant Length) WUR Frame and do not carry a Frame Body field, the Length field 264 in FIG. 2 may be re-purposed in WUR Beacon frames. The first 2 bits of the Length field 264 may be used for the D-CH Index field 1806 to indicate the WUR Discovery channel used by the AP to transmit its WUR Discovery frames. Since a WUR Beacon may be transmitted much more frequently compared to a WUR Discovery frame, during a Smart Scan this information along with the TXID 1812 carried in the Address field 1810 may be utilized by a WUR STA to expedite the collection of WUR Discovery frames. For example a WUR STA looking for the WUR Discovery frame from a particular AP of interest may stop scanning a channel upon receiving a WUR Beacon from the AP and switch to the WUR Discovery channel indicated in the WUR Beacon. The next 2 bits of the Length field 264 may be used for the P-TSF-H field 1808 to carry additional 2 higher significant bits of the AP's TSF such that by combining the P-TSF-H field 1808 with the P-TSF field 1814, a WUR Beacon's partial time-stamp range can be increased. Also in case of managed networks such as the enterprise WLAN network depicted Scenario 900 in FIG. 9, if a WUR STA is in possession of an up-to date report of neighbor APs, upon receiving a WUR Beacon from an AP, by cross referencing the TXID 1812 of the AP with the neighbor AP report, for example the Reduced Neighbor Report element 1400 in FIG. 14, the WUR STA can figure out the AP's details necessary to initiate a PCR Scan and link setup procedure and need not wait for a WUR Discovery frame from the AP.

Second Embodiment

Figure 19:
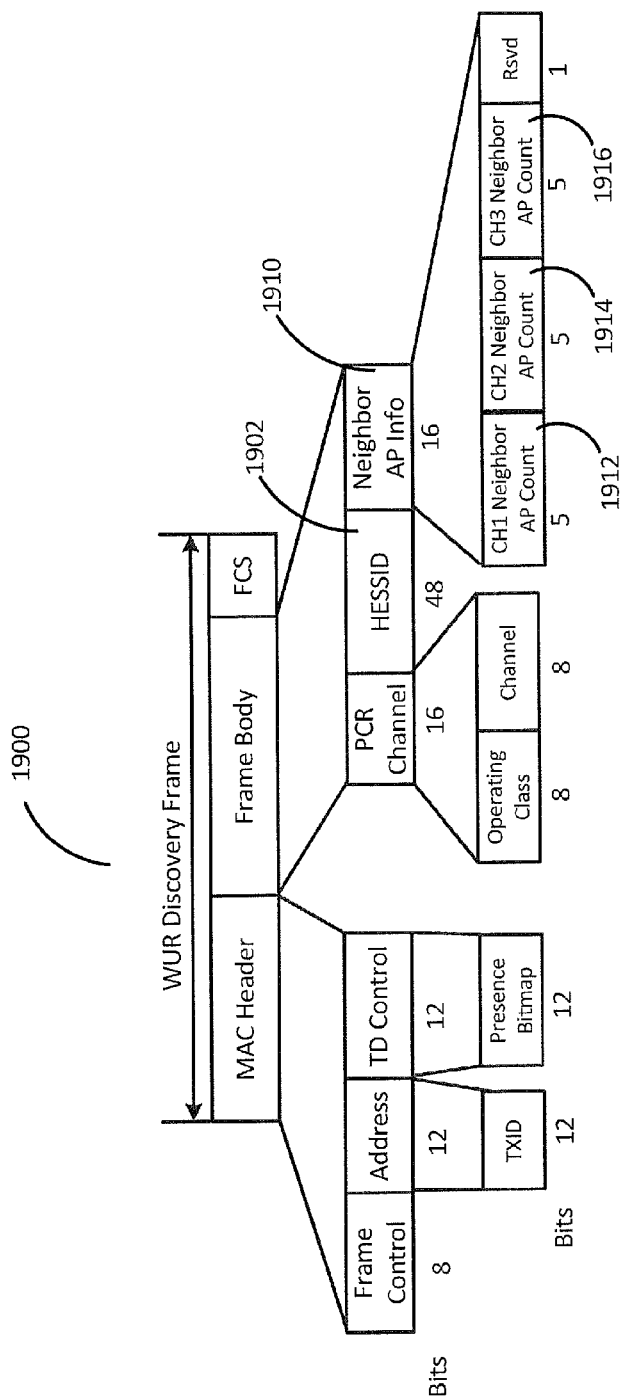
FIG. 19 shows an example WUR Discovery frame as per the second embodiment.

An alternate frame format of a WUR Discovery frame 1900 is shown in FIG. 19. The WUR Discovery frame 1900 follows the same structure as the WUR Discovery Frame 600 in FIG. 6 with the following differences:

1) The HESSID (Homogenous Extended Service Set Identifier) field 1902 is used to indicate the wireless network that the AP transmitting this frame represents. The HESSID field 1902 identifies a homogenous ESS which is a group of BSSs that all provide access to the same external networks. The value used as the HESSID is a BSSID of one of the APs within the homogenous ESS and takes the form of a MAC address (6 octets). HESSID is a globally unique identifier of a wireless network and may be preferred over SSID especially in unmanaged networks where there is a risk of multiple operators using the same SSID.

2) A Neighbor AP Info field 1910 is included in the Frame Body that indicates the count of the APs transmitting WUR Discovery frames in all the WUR Discovery channels. The Neighbor AP Info field 1910 is made up of the individual Neighbor AP count on each of the WUR Discovery channels. For example if there are three WUR Discovery channels defined, CH1 Neighbor AP Count field 1912 indicates the number of neighbor APs that also transmit WUR Discovery frames on the same Discovery channel (i.e. WUR Discovery channel 1). Similarly CH2 Neighbor AP Count field 1914 and CH3 Neighbor AP Count field 1916 indicate the number of neighbor APs that transmit WUR Discovery frames on the WUR Discovery channels 2 and 3 respectively. A key advantage of having the knowledge of APs transmitting WUR Discovery on each WUR Discovery channels is that if a WUR STA knows in advance that there are no WUR Discovery frames being transmitted on a certain channel, the STA can skip the particular channel entirely during the Fast Smart Scan, further reducing the scan latency.

Figure 20:
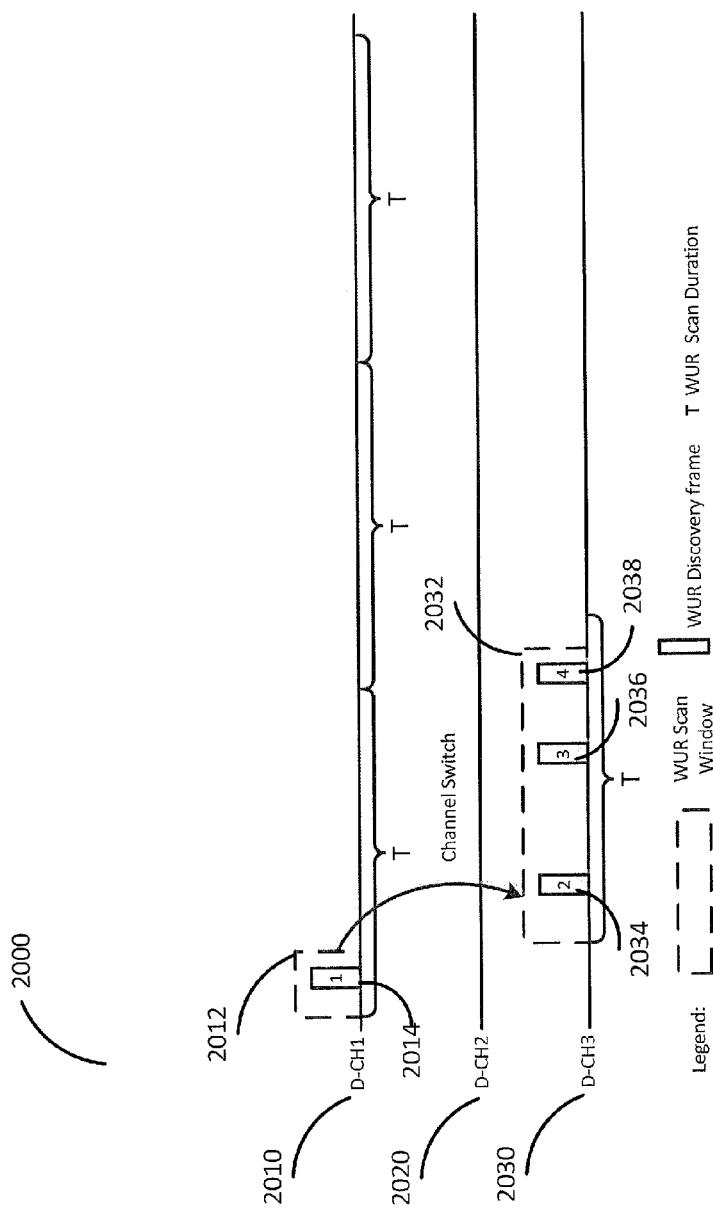
FIG. 20 shows an example of a Fast Smart Scanning procedure using a limited number of discovery channels as per the second embodiment.

The use of the Neighbor AP Info field 1910 is better explained through the example Fast Smart Scan procedure 2000 in FIG. 20. In this example there is one WUR Discovery frame 2014 being transmitted on the WUR Discovery channel D-CH1 2010 while three WUR Discovery frames 2034, 2036 and 2038 are transmitted on the WUR Discovery channel D-CH3 2030 while there are no WUR Discovery frames on the WUR Discovery channel D-CH2 2020. The CH1 Neighbor AP Count sub-field 1912 of the WUR Discovery frame 2014 indicates 0, the CH2 Neighbor AP Count sub-field 1914 also indicates 0, while the CH3 Neighbor AP Count sub-field 1916 indicates 3. A WUR STA that receives the WUR Discovery frame 2014, saves the relevant information regarding the transmitting AP and at the same time, through the content of the CH1 Neighbor AP Count sub-field 1912, the STA is informed that no other WUR Discovery frames are expected on the Discovery Channel D-CH1 2010. In addition, through the content of the CH2 Neighbor AP Count sub-field 1914, the STA is also informed that no WUR Discovery frames are expected on the Discovery Channel D-CH2 2020 as well. As such, the STA need not continue scanning on D-CH1 2010 till the end of the WUR Scan Duration but may cut short the WUR Scan window 2012 and immediately switch to the Discovery channel D-CH3 2030 skipping the Discovery channel 2020 altogether and start the WUR Scan window 2032. Once the STA has received all three WUR Discovery frames 2034, 2036 and 2038, it can terminate the Fast Smart Scan procedure 2000.

(Configuration of an Access Point)

Figure 21:
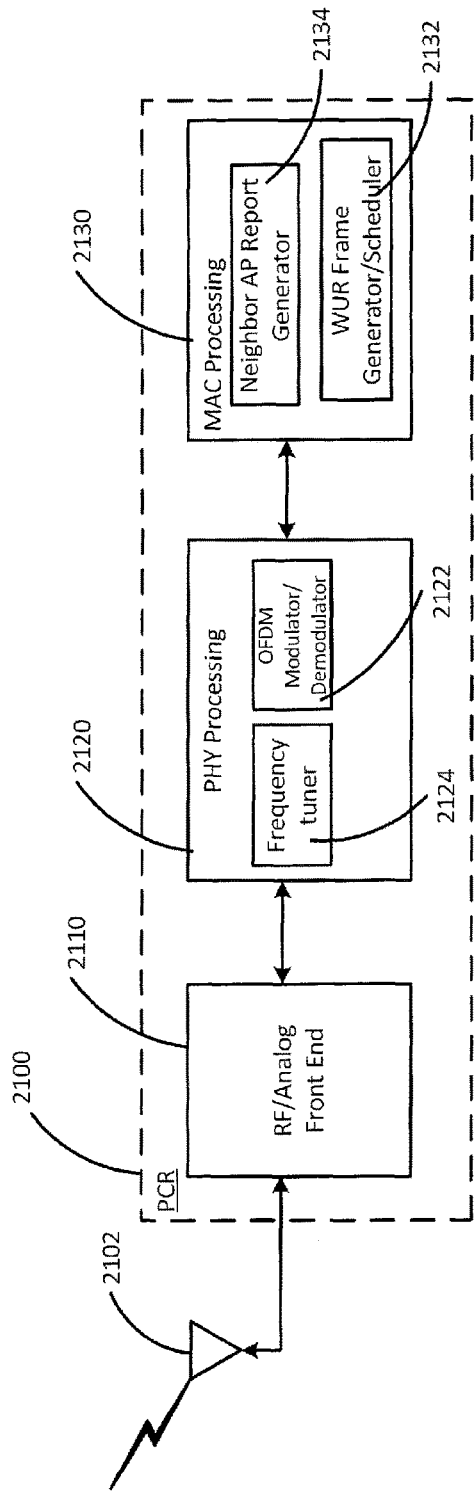
FIG. 21 is a simplified block diagram of an example AP that implements the disclosed scanning scheme.

FIG. 21 is a block diagram of the PCR 2100 of an example AP that implements the Fast Smart Scan described in the present disclosure. The AP may be the AP 110 in FIG. 1(The PCR 2100 may be the PCR 112 in FIG. 1). The PCR 2100 is connected to the antenna 2102, and is used for the transmission and reception of 802.11 signals as well as for the transmission of WUR PPDUs. PCR 2100 is comprised of an RF/Analog front end 2110, PHY processing circuitry 2120 and MAC processing circuitry 2130.

The RF/Analog front end 2110 is responsible for transfer of analog signals to/from the antenna 2102 and may comprise sub-components such as Automatic Gain Control (AGC), Low Pass Filter (LPF), Analog-to-Digital Converter (ADC) and so on.

The PHY Processing circuitry 2120 is responsible for the processing of the PHY layer signals and is further comprised of an OFDM modulator/demodulator 2122 and a Frequency Tuner 2124. The OFDM modulator/demodulator 2122 is responsible for the OFDM modulation of transmit signals or demodulation of received OFDM signals. On the transmission side, aside from applying OFDM modulation to 802.11 PPDUs, the OFDM modulator/demodulator 2122 is also used to generate WUR signal (e.g. OOK) by populating selected OFDM subcarriers. The Frequency Tuner 2124 is used to set the transmission frequency to the correct channel for transmissions or reception, for example to the PCR channel for transmission or reception of PCR signals, to the WUR Discovery channel for the transmission of WUR PPDUs carrying WUR Discovery frames and to the WUR Operational Channel for transmission of WUR PPDUS carrying rest of WUR frame types.

The MAC Processing circuitry 2130 is responsible for various MAC related processing such as retransmission, fragmentation, aggregation etcetera and is further comprised of a WUR Frame Generator/Scheduler 2132 and a Neighbor AP Report Generator 2134. The WUR Frame Generator/Scheduler 2132 is responsible for generating the contents of the payload carried in WUR PPDUs transmitted by the AP and to schedule them for transmission at the correct time. The Neighbor AP Report Generator 2134 is responsible for compiling a neighbor AP report based on inputs from a central controller or through the AP's own channel scanning etc. The Neighbor AP Report Generator 2134 is also responsible for generating the Neighbor AP count of the number of neighbor APs transmitting WUR Discovery frames on a channel.

Figure 22:
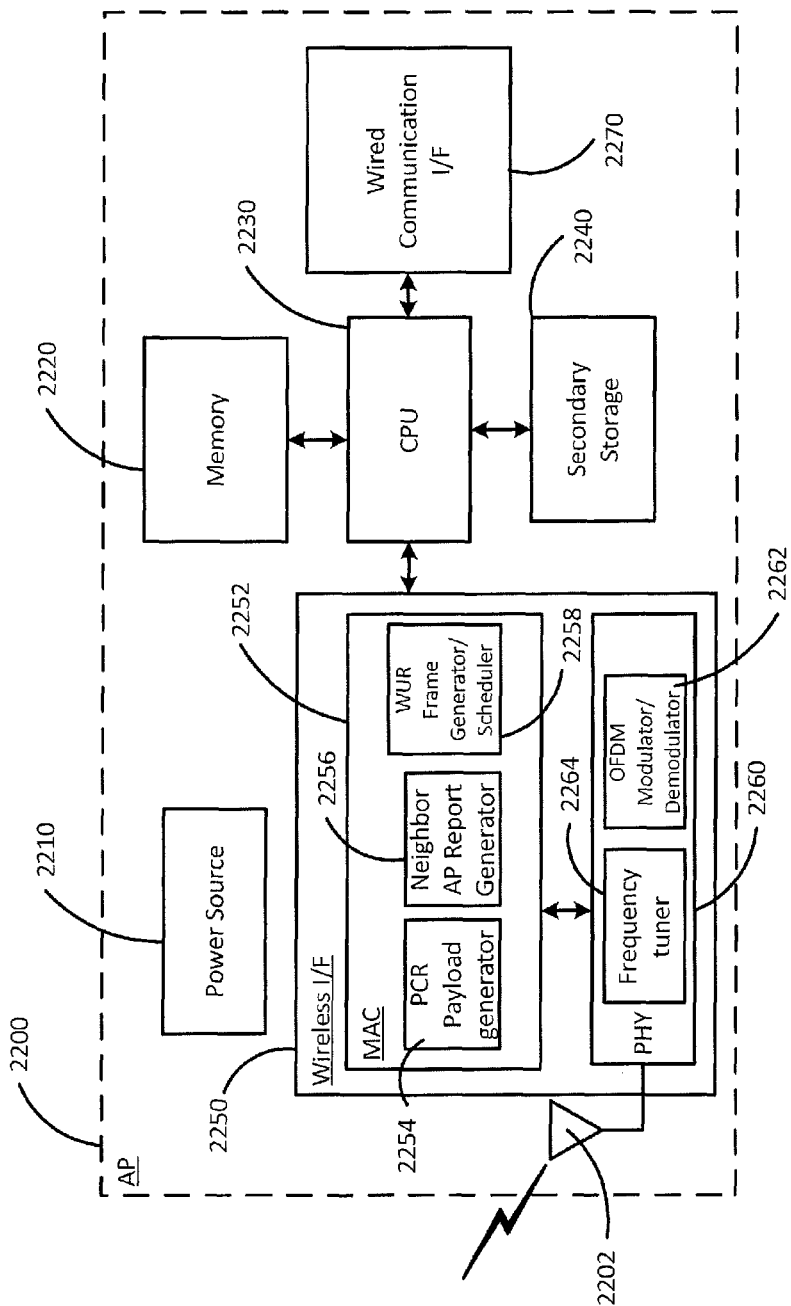
FIG. 22 is a detailed block diagram of an example AP that implements the disclosed scanning scheme.

FIG. 22 is a more detailed block diagram of an example AP 2200, which may be the AP 110 in FIG. 1. The AP 2200 comprises a Central Processing Unit (CPU) 2230 coupled to a memory 2220, a secondary storage 2240, one or more wireless communication interfaces 2250, as well as other wired communication interfaces 2270. The secondary storage 2240 may be a non-volatile computer readable storage medium that is used to permanently store pertinent instruction codes, data etc.

At the time of startup, the CPU 2230 may copy the instruction codes as well as related data to the volatile memory 2220 for execution. The instruction code may be an operating system, user applications, device drivers, execution codes etc. which are required for the operation of the AP 2200. The size of the instruction code and hence the storage capacity of both the secondary storage 2240 as well as the memory 2220 may be substantially bigger than that of the STA 2400 in FIG. 24.

The AP 2200 may also comprise a power source 2210 which in most cases may be a power mains but in some cases may also be some kind of high capacity battery for e.g. a car battery. The wired communication interface 2270 may be an ethernet interface, or a powerline interface, or a telephone line interface etc.

The wireless communication interface 2250 may comprise an interface for cellular communication, or an interface for short range communication protocols such as Zigbee, or it may be a WLAN interface. The Wireless interface 2250 may further comprise a MAC module 2252 and a PHY module 2260. The MAC module 2252 of an AP may be substantially more complicated than that of a STA 2400 in FIG. 24 and may comprise many sub-modules. Among other sub-modules, the MAC module 2252 may be comprised of a WUR Frame Generator/Scheduler 2258, a PCR payload generator 2254 and a Neighbor AP Report Generator 2256. The PHY module 2260 is responsible for the conversion of the MAC module data to/from the transmission/reception signals and is further comprised of an OFDM modulator/demodulator 2262 and a Frequency Tuner 2264. The wireless interface may also be coupled, via the PHY module, to one or more antennas 2202 that are responsible for the actual transmission/reception of the wireless communication signals on/from the wireless medium.

An AP as per the present disclosure may comprise many other components that are not illustrated, for sake of clarity, in FIG. 21 and FIG. 22. Only those components that are most pertinent to the present disclosure are illustrated.

(Configuration of a STA)

Figure 23:
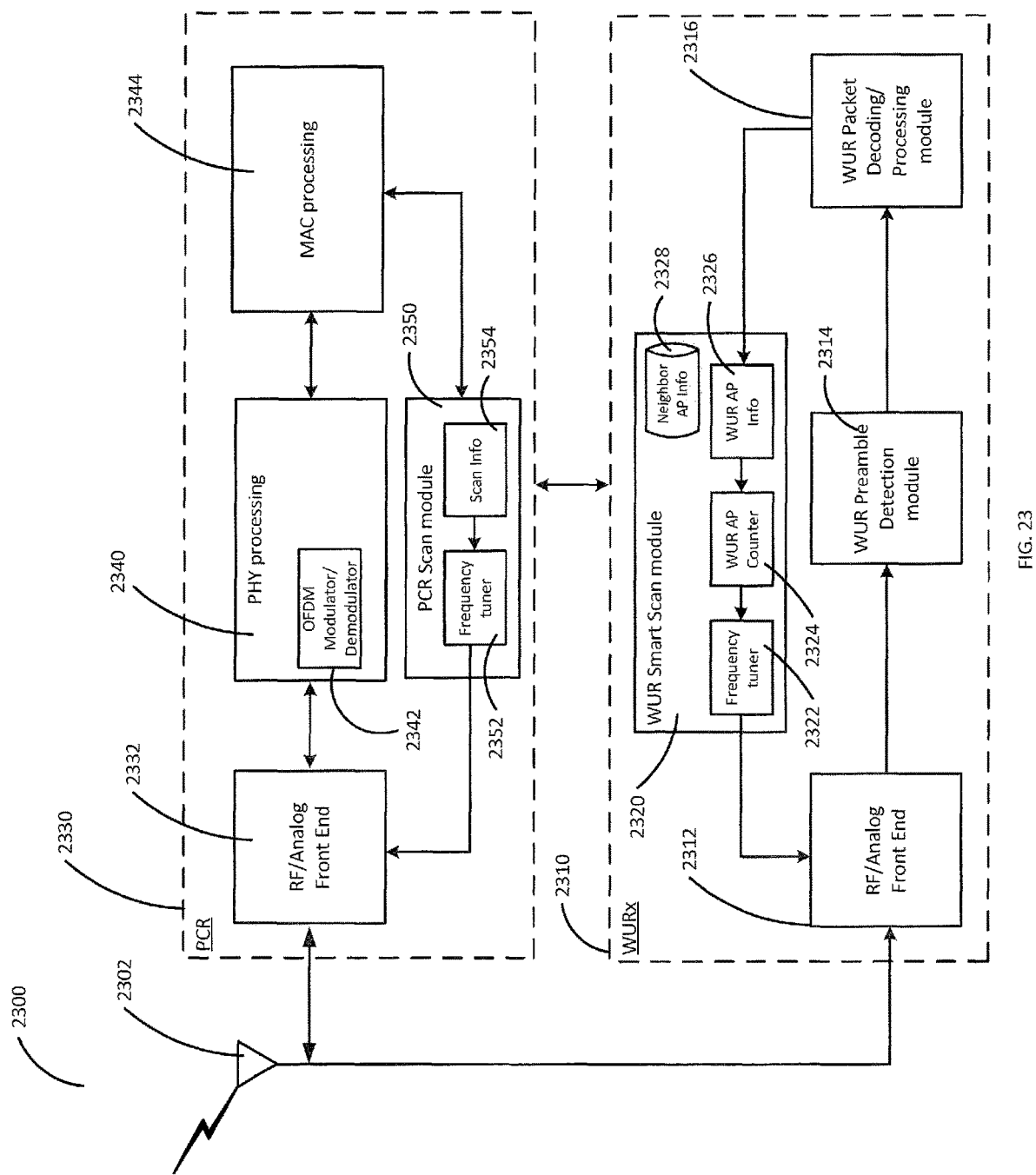
FIG. 23 is a simplified block diagram of an example WUR STA that implements the disclosed scanning scheme.

FIG. 23 illustrates a WUR STA 2300 that is equipped with two separate radios: a PCR 2330 for transmitting and receiving 802.11 OFDM signals and a WUR 2310 for receiving WUR PPDUs.

The WUR 2310 is further comprised of several sub components such as an RF/Analog Front End 2312 responsible for receiving the analog radio signals from the antenna 2302, a WUR Preamble Detection module 2314 responsible for detecting and decoding the preamble portion of the WUR PPDUs, a WUR Packet Decoding/Processing module 2316 responsible for decoding and processing the payload portion of the wakeup signal and a WUR Smart Scan module 2320 responsible for the Fast Smart Scan procedure presented in the current disclosure. The WUR Smart Scan module 2320 is further comprised of a Frequency tuner 2322 which is responsible for setting the reception frequency of the WURx to the correct WUR Discovery channel during a Smart Scan, a WUR AP Counter 2324 to keep count of the number of APs discovered during a Smart Scan and a WUR AP Info module 2326 that extracts relevant information regarding the APs discovered during a Smart Scan. The WUR Smart Scan module 2320 also maintains a database of Neighbor AP Info 2328 which may have been generated by the WURx 2310 itself or may have been provided by the PCR 2330 for use during the Smart Scan.

The PCR 2330 is comprised of an RF/Analog front end 2332, PHY processing circuitry 2340, MAC processing circuitry 2344 and a PCR Scan module 2350. The RF/Analog front end 2332 is responsible for transfer of analog signals to/from the antenna 2302 and may comprise sub-components such as Automatic Gain Control (AGC), Low Pass Filter (LPF), Analog-to-Digital Converter (ADC) and so on. The PHY Processing circuitry 2340 is responsible for the processing of the PHY layer signals and is further comprised of an OFDM modulator/demodulator 2342 that is responsible for the modulation of transmit OFDM signals or demodulation of received OFDM signals. The PCR Scan module 2350 is responsible for performing channel scans using the PCR and is further comprised of a Frequency tuner 2352 responsible for setting the reception frequency of the PCR to the correct channel during a PCR Scan, and a Scan Info 2354 that contains the list of channels to be scanned as well as other information pertinent to the scan such as target short-SSID etc. that were passed to the PCR by the WUR Smart Scan module 2320.

Figure 24:
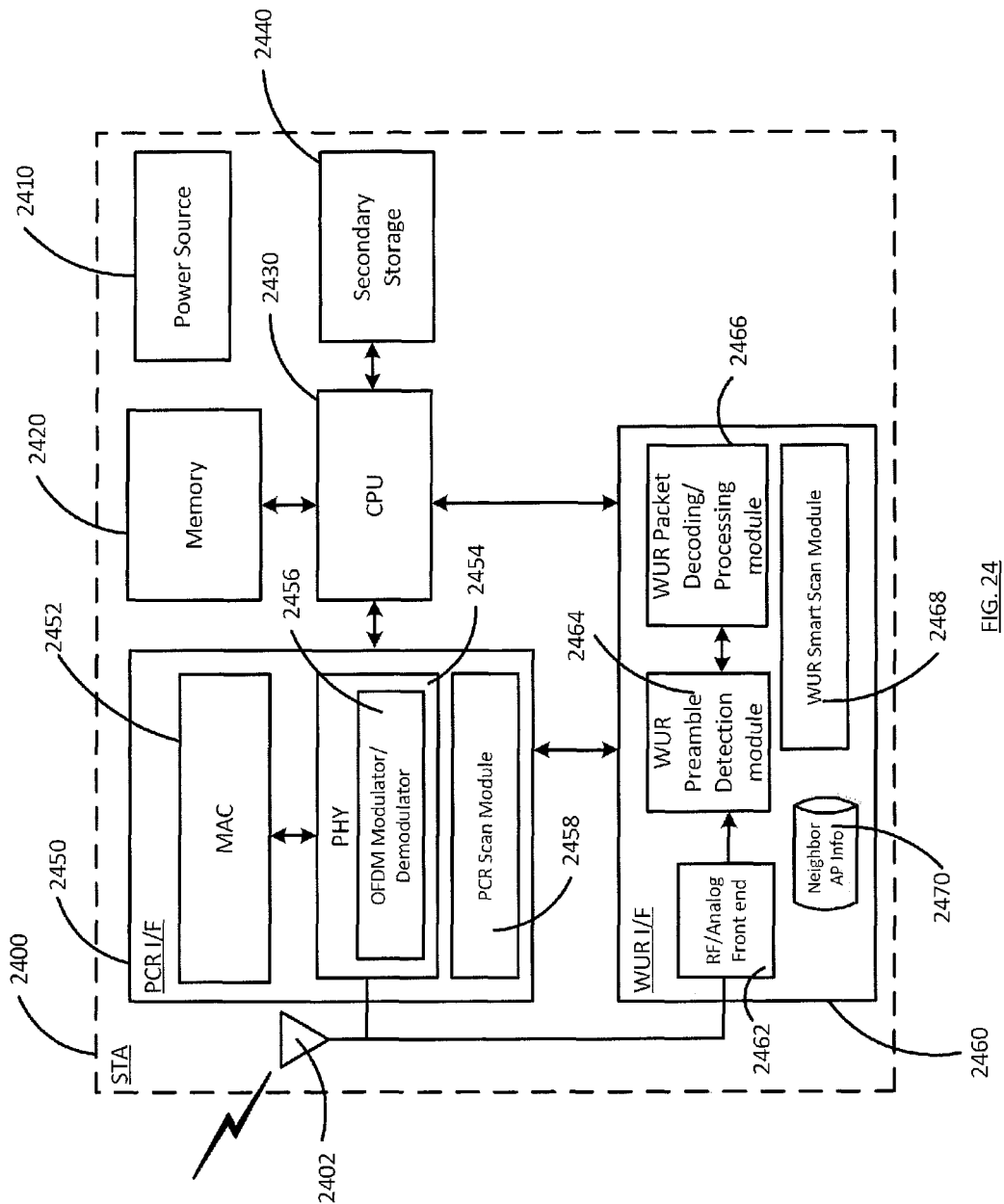
FIG. 24 is a detailed block diagram of an example WUR STA that implements the disclosed scanning scheme.

FIG. 24 is a detailed block diagram of an example STA 2400 that implements the Fast Smart Scan described in the present disclosure and may be STA 130 or STA 140 in FIG. 1. The STA 2400 is comprised of a Central Processing Unit (CPU) 2430 coupled to a memory 2420, a secondary storage 2440, one or more PCR interfaces 2450 as well a WUR interface 2460. Both the PCR interface 2450 and the WUR interface 2460 are connected to the same wireless antenna 2402. The secondary storage 2440 may be a non-volatile computer readable storage medium that is used to permanently store pertinent instruction codes, data etc.

At the time of startup, the CPU 2430 may copy the instruction codes as well as related data to the volatile memory 2420 for execution. The instruction code may be an operating system, user applications, device drivers, execution codes etc. which are required for the operation of the STA 2400. The STA 2400 may also comprise a power source 2410 for example a lithium ion battery or a coin cell battery etc. or it may also be Mains electricty. The PCR interface 2450 may comprise an interface for cellular communication, or an interface for short range communication protocols such as Zigbee, or it may be a WLAN interface.

The PCR interface 2450 is comprised of a MAC module 2452, a PHY module 2454 which is further comprised of an OFDM Modulator/Demodulator 2456 as well as a PCR Scan module 2458.

The WUR interface 2460 is comprised of several sub components such as an RF/Analog Front End 2462 responsible for receiving the analog radio signals from the antenna 2402, a WUR Preamble Detection module 2464 responsible for detecting and decoding the preamble portion of the wake up signal, a WUR Packet Decoding/Processing module 2466 responsible for decoding and processing the payload portion of the wakeup signal as well as a WUR Smart Scan module 2468 responsible for the Fast Smart Scan procedure presented in the current disclosure. The WUR interface 2460 also maintains a database of Neighbor AP Info 2470, possibly in a memory location commonly accessible by both the WUR interface as well as the PCR interface 2450.

A STA as per the present disclosure may comprise many other components that are not illustrated, for sake of clarity, in FIG. 23 or FIG. 24. Only those components that are most pertinent to the present disclosure are illustrated.

Third Embodiment

Figure 25:
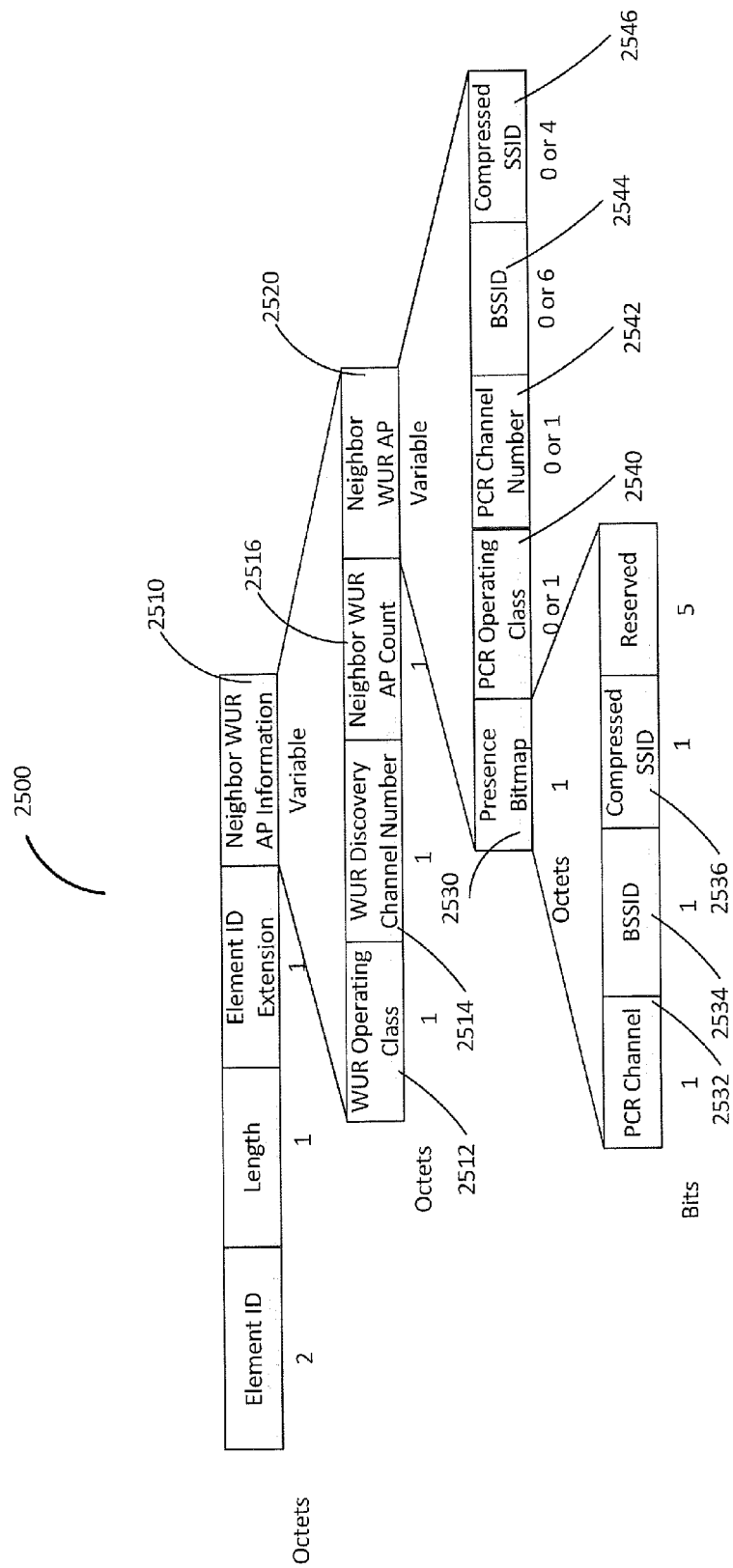
FIG. 25 shows an example Information element that may carry the Neighbor WUR AP Information as per the third embodiment.

In earlier embodiments, the information of neighbor APs that transmit WUR Discovery frames were carried in the WUR Discovery frames itself and this information was used during Fast Smart Scanning to cut down the smart scan latency. However, it is also possible that instead of using the WUR Discovery frames, the information of neighbor APs that transmit WUR Discovery frames may also be carried in 802.11 information elements which in turn are carried by PCR frames such as Beacon frames, Probe Response frames etc. FIG. 25 shows the Neighbor WUR AP Information element 2500 that may be used to carry one or more neighbor WUR AP information field 2510, one per WUR Discovery channel. Each Neighbor WUR AP Information field 2510 is variable in length and is comprised of a WUR Operating Class field 2512, a WUR Discovery Channel Number field 2514, a Neighbor WUR AP Count field 2516 and one or more Neighbor WUR AP field 2520. The WUR Operating Class field 2512 and the WUR Discovery Channel Number field 2514 together identify the WUR Discovery channel. The Neighbor WUR AP field 2520 carries information about the WUR APs that transmit WUR Discovery frames in the WUR Discovery channel while the Neighbor WUR AP Count field 2516 indicates the number of WUR APs listed in the Neighbor WUR AP field 2520, minus one; a value of zero indicating that one WUR AP is listed. A WUR Discovery channel in which there are no WUR APs transmitting WUR Discovery frames may be omitted from the Neighbor WUR AP field 2520. The Presence Bitmap field 2530 indicates the presence/absence of the various sub-fields in the Neighbor WUR AP field 2520, for example 1 indicating that a corresponding sub-field is present and 0 indicating that the sub-field is absent. The PCR Channel bit 2532 indicates the presence/absence of the PCR Operating Class subfield 2540 and the PCR Channel Number sub-field 2542 which together indicates the 20 MHz primary channel that the AP is operating on; the BSSID bit 2534 indicates the presence/absence of the BSSID sub-field 2544 that indicates the AP's BSSID while the Compressed SSID bit 2536 indicates the presence/absence of the Compressed SSID sub-field 2546 that represents the compressed version of the SSID of the network that is accessible through the AP. A WUR STA that receives the Neighbor WUR AP Information element 2500 may use the information of the APs transmitting WUR Discovery frame on the listed WUR Discovery channel to perform a Fast Smart Scan, for example the Fast Smart Scan 700 depicted in FIG. 7. The STA may use the Neighbor WUR AP count field 2516 to cut short the channel scan time on each WUR Discovery channel, while the information of the WUR AP carried in the Neighbor WUR AP field 2520, such as Compressed SSID 2546 may be utilized to further reduce the scan latency by only scanning the WUR Discovery channels used by APs with matching SSID. Even if the Neighbor WUR AP count field 2516 is not carried in the WUR AP Information element 2500, a receiving WUR STA may compile this information based on the number of unique APs listed in the Neighbor WUR AP field 2520. For the example shown in FIG. 7, prior to starting the smart scan 700, the WUR STA may already have received a Neighbor WUR AP Information element 2500, for example in a Beacon frame or Probe Response frame from the AP that the STA is associated with, or even in Beacon frames, Probe Response frames, FILS frames from other APs in the vicinity of the STA. In this example, the Neighbor WUR AP Information element 2500 indicates that one AP transmits WUR Discovery frames on the Discovery channel D-CH1 710, two APs transmit WUR Discovery frames on Discovery channel D-CH2 720 and one AP transmits WUR Discovery frames on Discovery channel D-CH2 730. The WUR STA starts the smart scanning by tuning its WURx to the Discovery channel D-CH1 710 and receives the WUR Discovery frame 714 and saves the relevant information regarding the transmitting AP. Based on the information carried in the Neighbor WUR AP Information element 2500, the STA is aware that no other APs transmit WUR Discovery frames on the Discovery Channel D-CH1 710. As such, the STA need not continue scanning on D-CH1 710 till the end of the WUR Scan Duration but may cut short the WUR Scan window 712 and immediately switch to the Discovery channel D-CH2 720 and start the WUR Scan window 722. Upon receiving the WUR Discovery frame 724, the STA is aware that one more AP transmits WUR Discovery frames on D-CH2 720. As such the STA continues to listen on the channel and receives the WUR Discovery frame 726. Since the STA has already received WUR Discovery frames from two APs, it may cut short the WUR Scan window 722 and immediately switch to the Discovery channel D-CH3 730 and start the WUR Scan window 732. Upon receiving the WUR Discovery frame 734, the STA being aware that no other APs transmit WUR Discovery frames on D-CH3 730 and also since D-CH3 730 is the last WUR Discovery channel on the scan list, the STA may cut short the WUR Scan window 732 and end the Fast Smart Scanning procedure 700 at time 742 which is considerably sooner than the end time 740 of the original Smart Scanning procedure. In summary, during a Fast Smart Scan performed with the aid of information of Neighbor WUR APs, a STA uses its WURx to continue listening on a WUR Discovery channel if the number of unique APs from which WUR Discovery frames have been received on the channel so far is less than the expected number of APs and the end of WUR Scan Duration is not reached, else the STA either terminates the Smart Scan if the current WUR Discovery channel is the last channel on the list of channels to be scanned, or switches to the next WUR Discovery channel used by one or more neighbor APs to transmit WUR Discovery frames. If the STA does not receive WUR Discovery frames from the expected number of APs, it may listen to a WUR Discovery channel for the entire WUR Scan Duration.

Figure 26:
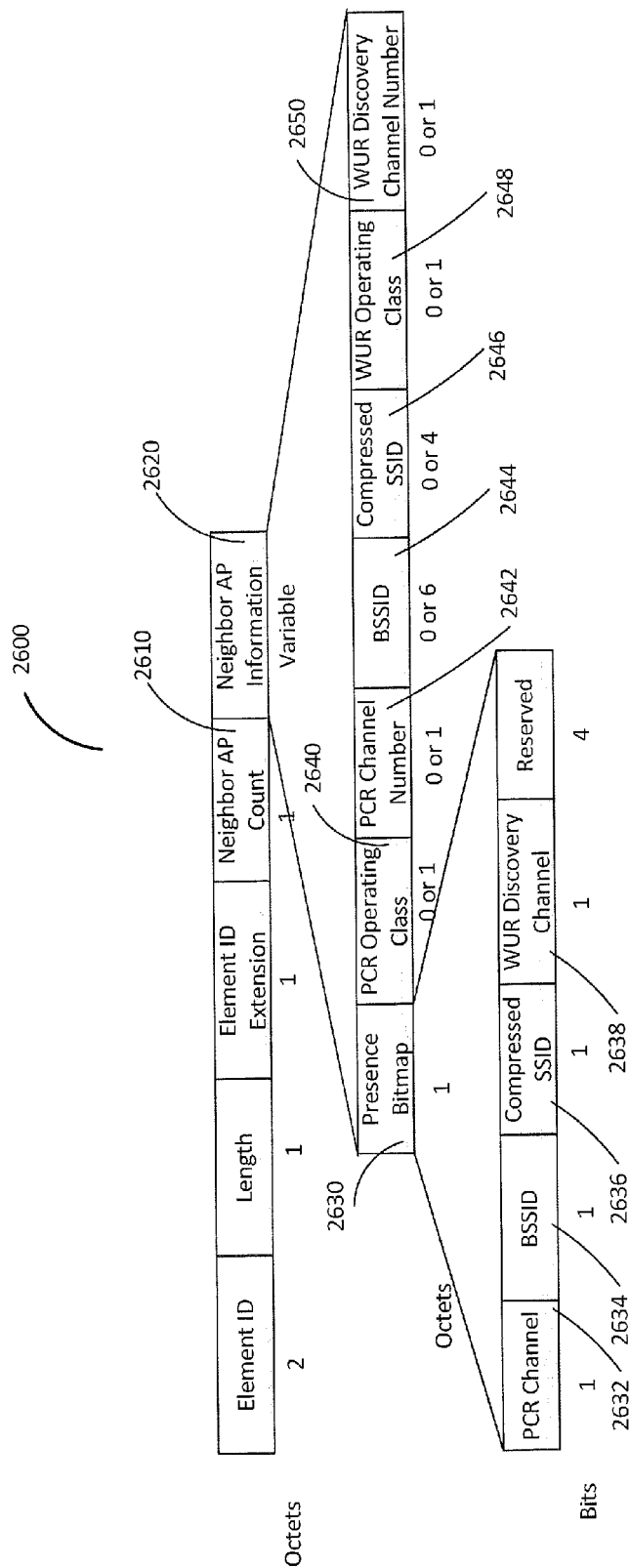
FIG. 26 shows an alternate example Information element that may carry the Neighbor WUR AP Information as per the third embodiment.

FIG. 26 shows an alternate format of Neighbor AP Information element 2600 that may be used to carry information of neighbor APs that transmit WUR Discovery frames. The Neighbor AP information field 2620 carries information about one or more neighbor APs that transmit WUR Discovery frames while the Neighbor AP Count field 2610 indicates the number of APs listed in the Neighbor AP Information field 2620, minus one; a value of zero indicating that one AP is listed. Each Neighbor AP Information field 2620 is variable in length and is comprised of a Presence Bitmap field 2630 and several optional sub-fields. The Presence Bitmap field 2630 indicates the presence/absence of the various sub-fields in the Neighbor AP Information field 2620, for example 1 indicating that a corresponding sub-field is present and 0 indicating that the sub-field is absent. The PCR Channel bit 2632 indicates the presence/absence of the PCR Operating Class subfield 2640 and the PCR Channel Number sub-field 2642 which together indicates the 20 MHz primary channel that the AP is operating on; the BSSID bit 2634 indicates the presence/absence of the BSSID sub-field 2644 that indicates the AP's BSSID while the Compressed SSID bit 2636 indicates the presence/absence of the Compressed SSID sub-field 2646 that represents the compressed version of the SSID of the network that is accessible through the AP. The WUR Discovery Channel bit 2638 indicates the presence/absence of the WUR Operating Class subfield 2648 and the WUR Discovery Channel Number sub-field 2650 which together identify the WUR Discovery channel that the AP uses to transmit its WUR Discovery frames. A WUR STA that receives the neighbor AP Information element 2600 may use the information of the APs transmitting WUR Discovery frame to perform the Fast Smart Scan 700 depicted in FIG. 7. Here, the Neighbor AP Count field 2610 indicates the total number of APs transmitting WUR Discovery frames across all possible WUR Discovery channels and the STA may use the Neighbor AP Count field 2610 to cut short the total scan time. The STA may may also compile the number of unique APs transmitting WUR Discovery frames on each WUR Discovery channel based on the contents of the Neighbor AP Information field 2620 and use this information to cut short the channel scan time on each WUR Discovery channel. The STA may further use other information of the AP carried in the Neighbor AP Information field 2620, such as Compressed SSID 2646 to further reduce the scan latency, for example by only scanning the WUR Discovery channels used by APs with matching SSID.

Figure 27:
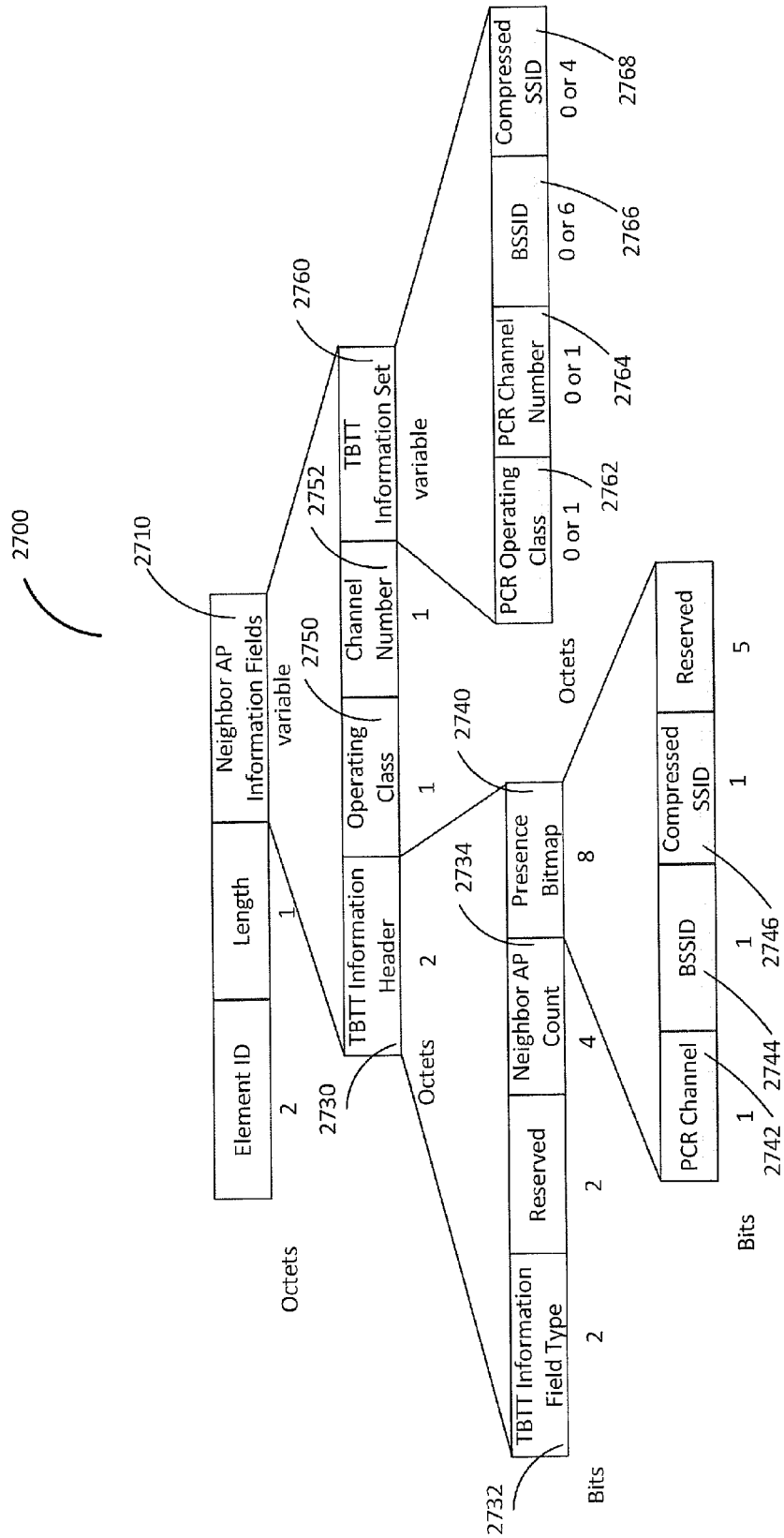
FIG. 27 shows the Reduced Neighbor Report element that may be re-purposed to carry the Neighbor WUR AP Information as per the third embodiment.

The Neighbor WUR AP Information element 2500 and the Neighbor AP Information element 2600 are examples of information elements newly defined for the purpose of carrying information about neighbor APs that transmit WUR Discovery frames. Instead of defining new elements, it is also possible that an existing 802.11 neighbor element may be re-used for the purpose. FIG. 27 shows an example of the 802.11 Reduced Neighbor Report element 2700 re-purposed to carry information about neighbor APs that transmit WUR Discovery frames. The Neighbor AP Information Fields field 2710 carries one or more Neighbor AP Information field, each carrying information about a group of neighbor APs on one channel. The TBTT Information Field Type field 2732 within the TBTT Information Header field 2730 determines the usage and format of the Reduced Neighbor Report element and is set to 0 or 1 for existing 802.11 usage. The TBTT Information Field Type field 2732 is set to 2 to indicate that the Reduced Neighbor Report element 2700 is re-purposed to carry information about neighbor APs that transmit WUR Discovery frames. In this usage, the Operating Class field 2750 and the Channel Number field 2752 together identify the WUR Discovery channel that is used to transmit WUR Discovery frames by a group of neighbor APs. The TBTT Information Set field 2760 carries more information about one or neighbor APs that transmit WUR Discovery frames on the WUR Discovery channel indicated by the Operating Class field 2750 and the Channel Number field 2752, the Neighbor AP Count field 2734 indicating the number of neighbor APs listed in the TBTT Information Set field 2760, minus one; a value of zero indicating that one AP is listed. The Presence Bitmap field 2740 indicates the presence/absence of the various sub-fields in the TBTT Information Set field 2760, for example 1 indicating that a corresponding sub-field is present and 0 indicating that the sub-field is absent. The PCR Channel bit 2742 indicates the presence/absence of the PCR Operating Class subfield 2762 and the PCR Channel Number sub-field 2764 which together indicates the 20 MHz primary channel that the AP is operating on; the BSSID bit 2744 indicates the presence/absence of the BSSID sub-field 2766 that indicates the AP's BSSID while the Compressed SSID bit 2746 indicates the presence/absence of the Compressed SSID sub-field 2768 that represents the compressed version of the SSID of the network that is accessible through the AP. A WUR STA that receives the Reduced Neighbor Report element 2700 may use the information of the neighbor APs transmitting WUR Discovery frame on the listed WUR Discovery channels to perform a Fast Smart Scan, for example the Fast Smart Scan 700 depicted in FIG. 7. The STA may use the Neighbor AP Count field 2734 to cut short the channel scan time on each WUR Discovery channel, while the information of the WUR AP carried in the TBTT Information Set field 2760, such as Compressed SSID 2746 may be utilized to further reduce the scan latency by only scanning the WUR Discovery channels used by APs with matching SSID.

Figure 28:
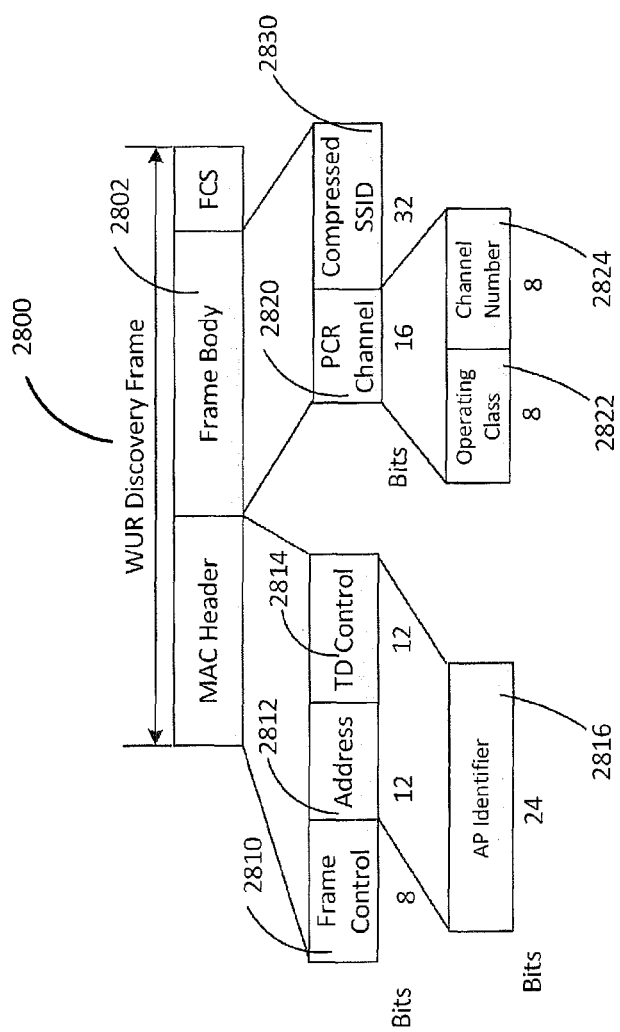
FIG. 28 shows the minimally compressed WUR Discovery frame as per the third embodiment.

FIG. 28 shows the format of a minimally compressed WUR Discovery frames that may be transmitted by WUR APs that support Smart Scanning. The WUR Discovery frame 2800 follows the same structure as the WUR Frame 230 in FIG. 2, with the Frame Type field in the Frame Control field 2810 indicating a WUR Discovery frame and the Length field indicating the length of the Frame Body field 2802. The Address field 2812 and the TD Control field 2814 together carry the AP Identifier 2816. The AP Identifier 2816 is 24 bits long and represents the transmitting AP's Basic Service Set Identifier (BSSID). The AP Identifier 2816 may be set to the last three octets of the AP's BSSID, i.e. BSSID (24:47), which represents the Vendor assigned portion of the AP's BSSID. This ensures that the AP Identifier 2816 is unique for different APs that use the same Organizationally Unique Identifier (OUI). However, with a small probability, APs using different OUI may end up using the same AP Identifier. To overcome this, an AP may also perform a bitwise exclusive OR (XOR) of the first three octets of its BSSID, i.e. BSSID (0:23), with the last three octets of its BSSID, i.e. BSSID (24:47) to obtain the AP identifier 2816. The PCR Channel sub-field 2820 indicates the primary 20 MHz channel that the AP uses for its PCR and the Operating Class field 2822 and the Channel Number field 2824 together uniquely identify the primary 20 MHz channel. The Compressed SSID field 2830 represents the compressed version of the SSID of the network represented by the AP.

Figure 29:
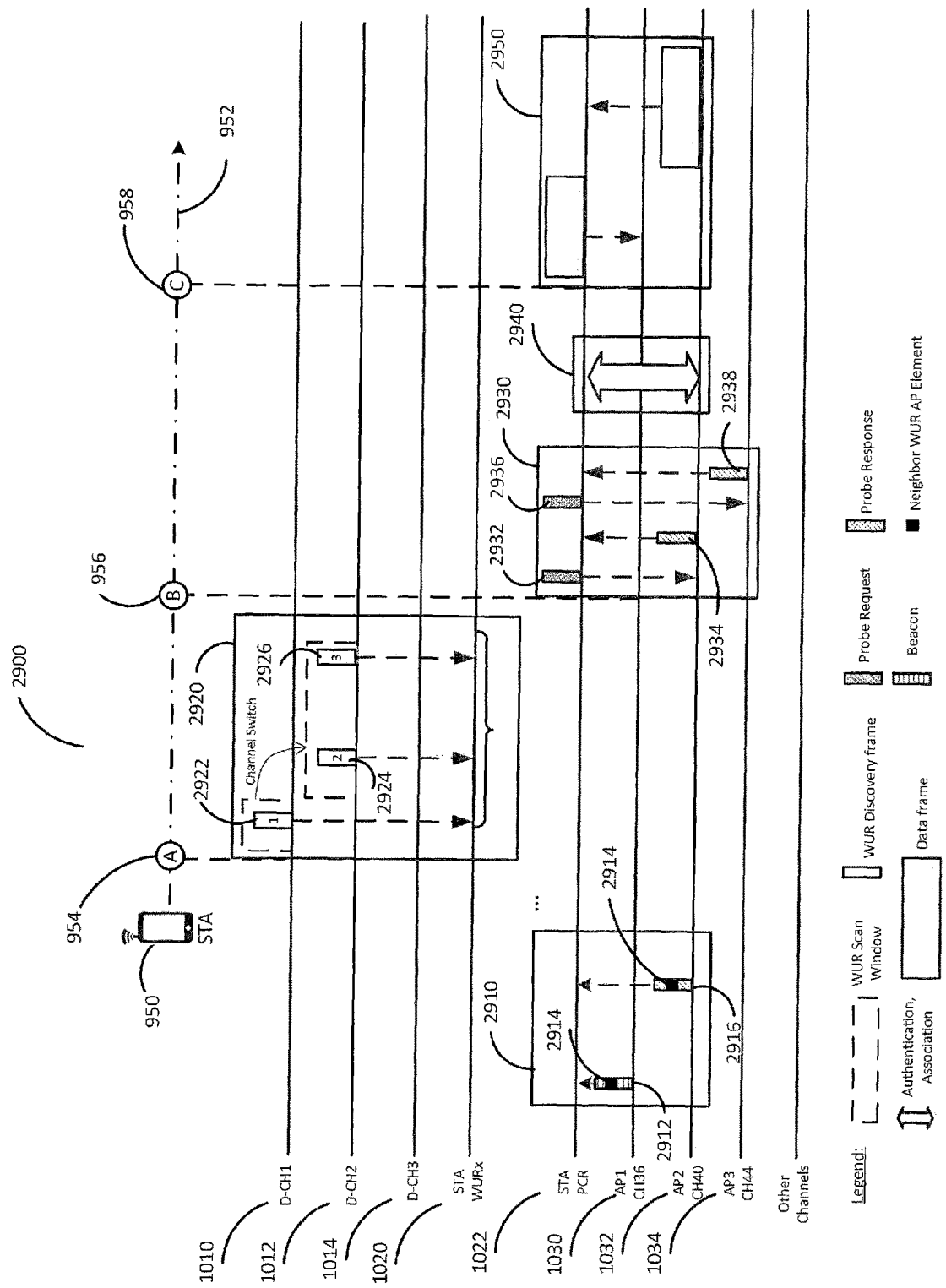
FIG. 29 shows an alternative time domain view of the example roaming scenario of FIG. 11 as per the third embodiment.

The scenario 900 in FIG. 9 and the time domain sequence 2900 in FIG. 29 may be used to illustrate an example Fast Smart Scanning procedure 2920 that makes use of the PCR based Neighbor AP Information elements to reduce the Smart Scan latency. Before STA 950 in FIG. 9 starts roaming, it is assumed that during its PCR operation 2910, STA 950 would have received Beacon frame 2912 with the Neighbor WUR AP Information element 2914 from its associated AP1 912, carrying information of neighbor APs capable of transmitting WUR Discovery frames. Alternatively, the Neighbor WUR AP Information element 2914 may also have been received from other APs in the vicinity, for example in Probe Response frame 2916 from AP2 922. The Neighbor WUR AP Information element 2914 may be the element 2500 in FIG. 25. The Neighbor WUR AP Information element 2914 indicates that AP1 912 transmits WUR Discovery frames on WUR Discovery channel D-CH1 1010, AP2 922 and AP3 932 transmit WUR Discovery frames on WUR Discovery channel D-CH2 1012, and AP4 942 transmits WUR Discovery frames on WUR Discovery channel D-CH3 1014. The WUR Discovery frames may use the frame format 2800 in FIG. 28. By inspecting the compressed SSID field 2546 of the APs listed in the Neighbor WUR AP Information element 2914, the STA may choose to focus its Smart Scan only on the Discovery channels D-CH1 1010 and D-CH2 1012 that are used by ESS1 APs. At point A 954, STA 950 initiates the Fast Smart Scan procedure 2920 and first tunes its WURx 134 on the WUR Discovery channel D-CH1 1010 and receives the WUR Discovery frame 2922 from AP1. Since the STA has prior knowledge, based on the contents of the Neighbor WUR AP Information element 2914, that AP1 is the only AP transmitting WUR Discovery frames on channel D-CH1 1010, it can immediately switch channels to WUR Discovery channel D-CH2 1012 and receives WUR Discovery frames 2924 and 2926 from AP2 922 and AP3 932 respectively. Having received WUR Discovery frames from both the APs transmitting on channel D-CH2 1012, and not being interested in the WUR Discovery frames transmitted by AP4 on channel D-CH3 1014, the STA can immediately terminate the Fast Smart Scan procedure 2920.

At the end of the Fast Smart Scanning procedure 2920, having received all three WUR Discovery frames from the three ESS1 APs and based on their contents, along with cross referencing to the Neighbor WUR AP Information element 2914 if needed, STA 950 can further shortlist a few APs of interest. For example, based on the AP identifier 2816, STA 950 may discard AP1 912 and shortlist AP2 922 and AP3 932 as the two candidate APs for roaming. STA 950 may also use additional information to make the shortlisting decision, for example the RSSI (Receive Signal Strength Indicator) of the WUR Discovery frames 2924 and 2926. At point B 956, STA 950 extracts the necessary information such as each AP's primary PCR channel from the received WUR Discovery frames and uses its PCR 132 to initiate the Active Scan procedure 2930 and sends out Probe Request frames 2932 and 2936 to AP2 922 and AP3 932 on PCR channels CH40 1032 and CH44 1034 respectively. Since STA 950 is interested in joining a BSS belonging to its current ESS i.e. ESS1, it sets the SSID field of the Probe Request frames 2932 and 2936 to the SSID of ESS1 and subsequently receives Probe Response frames 2934 and 2938 from AP2 922 and AP3 932 respectively. Since a Probe Response frame can carry much more information compared to the WUR Discovery frame, STA 950 chooses AP2 922 as its preferred AP for roaming, for example based on the BSS load information carried in the Probe Response frames 2934 and 2938 and performs the link setup procedure 2940 (Authentication, Association etc.) with AP2 922. At point C 958, before losing the communication link with AP1 912, STA 950 is able to start the data exchange 2950 with AP2 922 over its PCR 132. It can be seen that performing the WUR Fast Smart Scan 2920 in the background and being able to shortlist candidate APs, may significantly cut down the time required for the Active Scan procedure 2930 and enable fast roaming.

Figure 30:
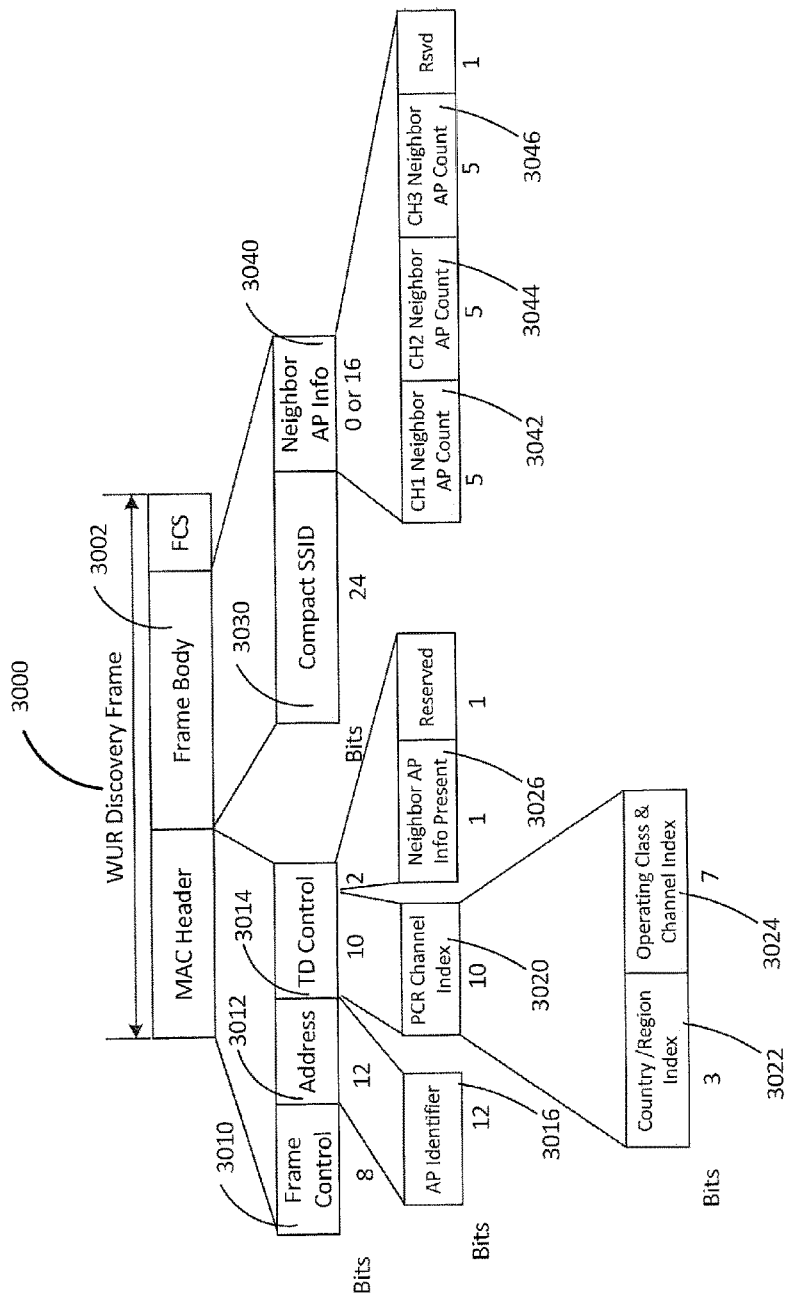
FIG. 30 shows a compressed version of WUR Discovery frame as per the third embodiment.

FIG. 30 shows the alternate format of a compressed WUR Discovery frame that may be transmitted by WUR APs that support Smart Scanning. The WUR Discovery frame 3000 follows the same structure as the WUR Frame 230 in FIG. 2, with the Frame Type field in the Frame Control field 3010 indicating a WUR Discovery frame and the Length field indicating the length of the Frame Body field 3002. The Address field 3012 carries the AP Identifier 3016. The AP Identifier 3016 is 12 bits long and may be a specially assigned Identifier or it may represent the transmitting AP's Basic Service Set Identifier (BSSID). For example, the AP Identifier 3016 may be set to the last 12 bits of the AP's BSSID, i.e. BSSID (36:47). The PCR Channel Index sub-field 3020 occupies the first 10 bits of the TD Control field 3014 and maps to the primary 20 MHz channel that the AP uses for its PCR. The 11th bit of the TD Control field 3014 is used as the Neighbor AP Info present bit to indicate the presence/absence of the Neighbor AP Info field 3040 in the Frame Body field 3002. The Compact SSID field 3030 carries the 24 bits of the hashed representation of the SSID of the network represented by the AP and may be obtained by running the AP's SSID through a common hash function such as SHA-256 and truncating to 24 bits. The Neighbor AP Info field 3040 is made up of the individual Neighbor AP count on each of the WUR Discovery channels. For example if there are three WUR Discovery channels defined, CH1 Neighbor AP Count field 3042 indicates the number of neighbor APs that also transmit WUR Discovery frames on the same Discovery channel (i.e. WUR Discovery channel 1). Similarly CH2 Neighbor AP Count field 3044 and CH3 Neighbor AP Count field 3046 indicate the number of neighbor APs that transmit WUR Discovery frames on the WUR Discovery channels 2 and 3 respectively. The PCR Channel Index sub-field 3020 is made up of the Country/Region Index field 3022 and the Operating Class & Channel Index field 3024 which together uniquely identifies the Operating class and the Channel number of the 20 MHz channel used by the transmitting AP's PCR.

Table 3100 in FIG. 31A represents the encoding used for the Country/Region Index field 3022 and indicates the country or the region for the Operating Class & Channel Index field 3024. Values 0, 1, 2, 3 and 4 of the Index 3102 represents United States, Europe, Japan, Global and China respectively while values 5, 6 and 7 are reserved. Table 3110 in FIG. 31B is an example table that maps the Operating Class & Channel Index field 3024 to the Operating Class and Channel Number of all applicable 20 MHz channels when the Country/Region Index field 3022 is set to 0 (United States). Values 0 to 51 of the Index 3112 maps to 52 unique combinations of the Operating class and Channel Numbers of the 20 MHz channels that may be used in the United States while values 52 to 127 are reserved. Although not shown, similar tables may be made by listing all the 20 MHz channels in each of the other countries/regions.

When designing the parameters for transmission of WUR Discovery frames by APs that support Smart Scan, it is also important to take into account the wireless channels used by the AP for PCR transmission as well as WUR transmissions. This is especially true if the PCR and WUR transmissions use channels on different frequency bands. It is well known that the transmission range of wireless signal depends on the frequency of the wireless signals. If transmitted at the same transmission power, wireless signals in the 2.4 GHz band cover roughly twice the distance compared to the 5 GHz band. Due to the narrow band nature of WUR waveform, IEEE 802.11ba Taskgroup has decided that the Dynamic Frequency Selection (DFS) channels in the 5 GHz band should not be used as WUR Channels. In addition, due to the longer range in the 2.4 GHz, it is possible that an AP may use the 5 GHz band for its PCR transmissions while the 2.4 GHz band is used for transmissions of the WUR Discovery frames. In such situations, if the AP uses the same transmit power for both the PCR as well as WUR transmissions, the transmission range of WUR Discovery frames in the 2.4 GHz band could be almost double that of 802.11 Beacon frames in the 5 GHz band. This may lead to situations where a WUR STA performing Smart Scanning may receive WUR Discovery frames from an AP and select it as candidate AP for roaming but fail to receive Beacon frames or Probe Response frames from the AP during passive/active scan using the PCR. In order to avoid such range mismatch issues between the PCR and WUR, it is recommended that when transmitting WUR Discovery frames, the AP adjusts the transmit power such that the transmission range of the WUR Discovery frames are roughly the same as that of 802.11 Beacon frames. This will ensure that a WUR STA that is able to receive WUR Discovery frame from an AP is also able to communicate with the AP using the PCR. In the reverse case where the PCR uses channels in the 2.4 GHz band while the WUR uses the 5 GHz band, the transmission power of WUR transmissions need to be boosted in order to meet the range requirement. In this case, in order to ensure reliable WUR operation, transmission power adjustment need to be considered not just for WUR Discovery frames but also for the WUR Wakeup frames as well as WUR Beacon frames.

Fourth Embodiment

Figure 33:
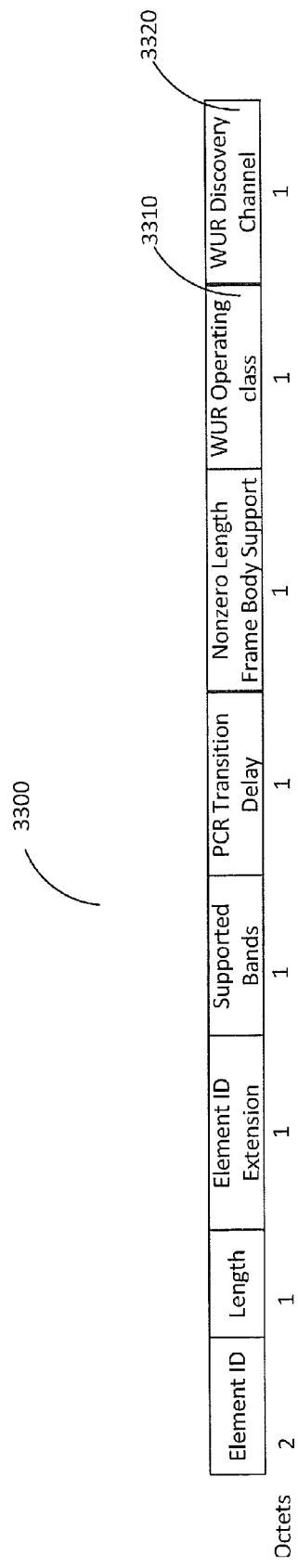
FIG. 33 shows the WUR Capability element as per the fourth embodiment.

In the third embodiment, it was described how a WUR STA may receive the information of neighbor APs that transmit WUR Discovery frames, from its associated AP or any other AP in the vicinity and use this information to expedite its scan/roaming operations. In some network deployments though, APs may not support the transmission of information of neighbor APs. However an AP that transmits WUR Discovery frames will advertise the WUR Discovery channel that it transmits the WUR Discovery frames in frames such as Beacon frames, Probe Response frames etc., for example using the WUR Discovery channel field 514 of the WUR Operation element 500 in FIG. 5. Alternatively, the WUR Discovery channel may also be advertised using a combination of WUR Operating class field 3310 and the WUR Discovery channel field 3320 of the WUR Capability element 3300 in FIG. 33. In such situations, a WUR STA may compile its own report of the neighboring APs in order to assist it in future roaming decisions.

Figure 32:
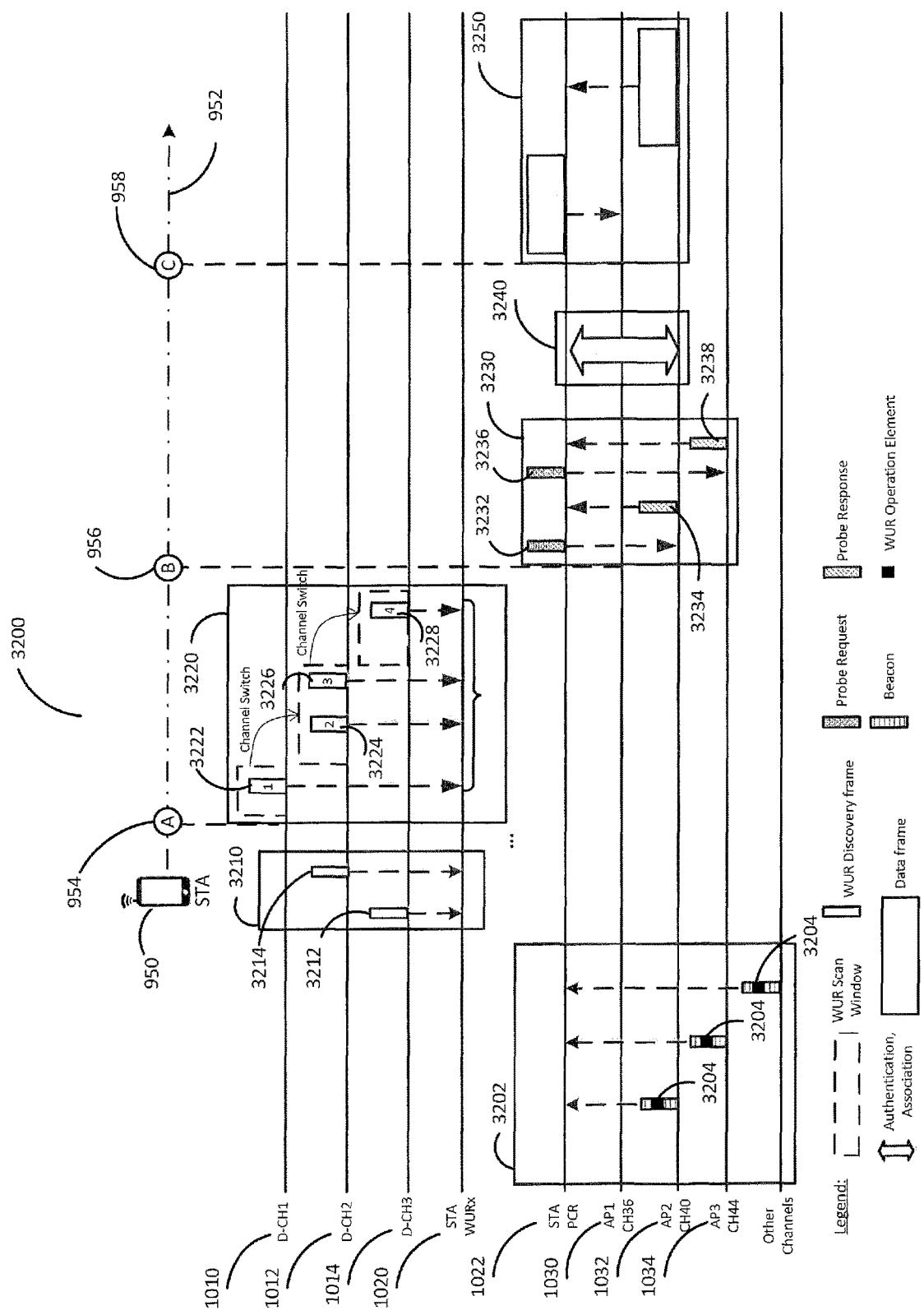
FIG. 32 shows an alternative time domain view of the example roaming scenario of FIG. 9 as per the fourth embodiment.

The scenario 900 in FIG. 9 and the time domain sequence 3200 in FIG. 32 may be used to illustrate an example of a WUR STA compiling its own report of neighbor APs to reduce the roaming latency. Before STA 950 in FIG. 9 starts roaming, it is assumed that during idle times in its PCR operation 3202, STA 950 may gather information regarding neighbor APs that transmit WUR Discovery frames. PCR operation 3202 may involve off-channel passive scans by the STA to gather WUR Operation elements 3204 carried in Beacon frames, Probe Response frames from neighboring APs, on PCR channels other than its operational channel. The WUR Operation element 3204 may be WUR Operation element 500 in FIG. 5. Additionally, the STA 950 may also perform scans 3210 using its WURx on WUR Discovery channels to receive WUR Discovery frames 3212, 3214 etc. when it is in idle WUR mode. Using such information gathered during its idle time, STA 950 may prepare a report of neighbor APs that transmit WUR Discovery frames. As an example, the report may indicate that AP1 912 transmits WUR Discovery frames on WUR Discovery channel D-CH1 1010, AP2 922 and AP3 932 transmit WUR Discovery frames on WUR Discovery channel D-CH2 1012, and AP4 942 transmits WUR Discovery frames on WUR Discovery channel D-CH3 1014. The WUR Discovery frames may use the frame format 2800 in FIG. 28. At point A 954, STA 950 initiates the Fast Smart Scan procedure 3220 and first tunes its WURx 134 on the WUR Discovery channel D-CH1 1010 and receives the WUR Discovery frame 3222 from AP1. Based on the contents of report it has compiled on neighboring APs, STA 950 has prior knowledge that AP1 is the only AP transmitting WUR Discovery frames on channel D-CH1 1010, hence it can immediately switch channels to WUR Discovery channel D-CH2 1012 and receives WUR Discovery frames 3224 and 3226 from AP2 922 and AP3 932 respectively. Similarly, STA 950 has prior knowledge that AP1 and AP2 are the only two APs transmitting WUR Discovery frames on channel D-CH2 1012, hence it can immediately switch channels to WUR Discovery channel D-CH3 1014 and receives WUR Discovery frames 3228 from AP4 942. Since STA 950 has prior knowledge that AP4 is the only AP transmitting WUR Discovery frames on channel D-CH3 1014, the STA can immediately terminate the Fast Smart Scan procedure 3228 after receiving the WUR Discovery frame 3228.

At the end of the Fast Smart Scanning procedure 3220, based on the contents of the received WUR Discovery frames, STA 950 can further shortlist a few APs of interest. For example, based on the Compressed SSID field 2830, STA 950 may discard AP4 942 and shortlist AP2 922 and AP3 932 as the two candidate APs for roaming. STA 950 may also use additional information to make the shortlisting decision, for example the RSSI (Receive Signal Strength Indicator) of the WUR Discovery frames 3224, 3226 and 3228. At point B 956, STA 950 extracts the necessary information such as each AP's primary PCR channel from the received WUR Discovery frames and uses its PCR 132 to initiate the Active Scan procedure 3230 and sends out Probe Request frames 3232 and 3236 to AP2 922 and AP3 932 on PCR channels CH40 1032 and CH44 1034 respectively. Since STA 950 is interested in joining a BSS belonging to its current ESS i.e. ESS1, it sets the SSID field of the Probe Request frames 3232 and 3236 to the SSID of ESS1 and subsequently receives Probe Response frames 3234 and 3238 from AP2 922 and AP3 932 respectively. Since a Probe Response frame can carry much more information compared to the WUR Discovery frame, STA 950 chooses AP2 922 as its preferred AP for roaming, for example based on the capability element carried in the Probe Response frames 3234 and 3238 and performs the link setup procedure 3240 (Authentication, Association etc.) with AP2 922. At point C 958, before losing the communication link with AP1 912, STA 950 is able to start the data exchange 3250 with AP2 922 over its PCR 132. It can be seen that pre-compiling report of neighbor APs that transmit WUR Discovery frames and performing the WUR Fast Smart Scan 3220 may enable a STA to shortlist candidate APs and may significantly cut down the time required for the Active Scan procedure 3230 and enable fast roaming.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

The present disclosure can be realized by any kind of apparatus, device or system having a function of communication, which is referred as a communication apparatus. Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of Japanese Patent Application No. 2017-247681, filed on Dec. 25, 2017 and Japanese Patent Application No. 2018-020069, filed on Feb. 7, 2018, including the specification, drawings and abstract, is incorporated herein by reference in its entirety.

INDUSTRIAL APPLICABILITY

This disclosure can be applied to an apparatus and a method for WUR mode operation in a wireless network.

REFERENCE SIGNS LIST

110, 2100, 2200 AP
120 STA
130, 140, 2300, 2400 WUR STA
112, 122, 132, 142, 2100, 2250, 2330, 2450 PCR
134, 144, 2310, 2460 WURx
2102, 2202, 2302, 2402 Antenna
2110, 2312, 2332, 2462 RF/Analog Front End
2120, 2260, 2340, 2454 PHY processing circuitry
2122, 2262, 2342, 2456 OFDM Modulator/Demodulator
2124, 2264, 2322, 2352 Frequency tuner
2134, 2256 Neighbor AP Report Generator
2132, 2258 WUR Frame Generator/Scheduler
2320, 2468 WUR Smart Scan module
2324 WUR AP Counter
2326 WUR AP Info
2350, 2458 PCR Scan module
2354 Scan Info
2130, 2252, 2344, 2452 MAC processing circuitry
2254 PCR Payload Generator
2328, 2470 Neighbor AP Info
2210, 2410 Power Source
2220, 2420 Memory
2230, 2430 CPU
2240, 2440 Secondary Storage
2250 Wireless I/F
2270 Wired Communication I/F
2314, 2464 WUR Preamble Detection
2316, 2466 WUR Packet Decoding/Processing module

The invention claimed is:
1. A communication apparatus, comprising:
a receiver, which, in operation, receives:
a Wake-up radio (WUR) Discovery element that indicates a WUR discovery channel used for transmission of a WUR Discovery frame from an access point (AP);

a WUR AP count indicated in a WUR AP count field, the WUR AP count indicating a number of APs which transmit WUR Discovery frame(s); and the WUR Discovery frame on the WUR discovery channel; and control circuitry, which is coupled to the receiver and which, in operation, scans the WUR discovery channel based on the WUR AP count.

2. The communication apparatus of claim 1, wherein the control circuitry, in operation, continues to scan the WUR discovery channel if the number of APs is equal to or greater than two, else the control circuitry, in operation, scans another WUR discovery channel or terminates scanning.

3. The communication apparatus of claim 1, wherein the WUR AP count is included in the WUR Discovery element.

4. The communication apparatus of claim 3,
wherein the WUR Discovery element comprises at least one WUR AP information field of which each WUR AP information field corresponds to each of at least one WUR discovery channel;
wherein the at least one WUR discovery channel is indicated by a WUR Operating Class field and a WUR Discovery Channel field, each field being included in a the corresponding WUR AP information field; and
wherein the number of APs is represented by the WUR AP count field in the WUR AP information field.

5. The communication apparatus of claim 1, wherein the WUR AP count information is included in the WUR Discovery frame.

6. The communication apparatus of claim 1, wherein the WUR Discovery element is included in at least one of a Beacon frame or a Probe Response frame.

7. The communication apparatus of claim 6, wherein when the WUR Discovery element is included in the Beacon frame, the control circuitry periodically receives the Beacon frame from the AP.

8. The communication apparatus of claim 5, wherein the control circuitry, in operation, periodically receives the WUR Discovery frame from the AP.

9. The communication apparatus of claim 1, wherein the control circuitry, in operation, limits scanning of WUR discovery channels to the WUR discovery channel indicated in the WUR Discovery element.

10. The communication apparatus of claim 1, wherein the WUR Discovery element includes a bitmap field that indicates a presence of a basic service set identifier (BSSID) field and a short service set identifier (Short-SSID).

11. An access point, comprising:
signal generation circuitry, which, in operation, generates:
a Wake-up radio (WUR) Discovery element that carries information of a WUR discovery channel used for transmission of a WUR Discovery frame;
a WUR AP count indicated in a WUR AP count field, the WUR AP count indicating a number of APs which transmit WUR Discovery frame(s) on the WUR discovery channel; and
the WUR Discovery frame to be transmitted on the WUR discovery channel; and
a transmitter, which is coupled to the signal generation circuitry and which, in operation, transmits the WUR Discovery element, the WUR AP count, and the WUR Discovery frame.

12. The access point of claim 11, wherein the transmitter, in operation, periodically transmits the WUR Discovery frame on the WUR discovery channel.

13. The access point of claim 11,
wherein the WUR discovery channel is indicated by a WUR Operating Class field and a WUR Discovery Channel field, each field included in the WUR Discovery element.

14. The access point of claim 11, wherein the WUR Discovery element is included in at least one of a Beacon frame or a Probe Response frame.

15. The access point of claim 14, wherein when the WUR Discovery element is included in the Beacon frame, the transmitter periodically transmits the Beacon frame.

16. The access point of claim 12, wherein the WUR discovery channel used to transmit the WUR Discovery frame is selected from all possible WUR channels.

17. The access point of claim 11, wherein the WUR Discovery element includes a bitmap field that indicates a presence of a basic service set identifier (BSSID) field and a short service set identifier (Short-SSID).

18. The access point of claim 11, wherein WUR Discovery elements transmitted by neighboring access points are used to compile the information of WUR discovery channels used by the neighboring access points.

19. The access point of claim 11, wherein the WUR Discovery element contains at least one WUR AP information field that carries information of APs that transmit WUR Discovery frames on a particular WUR Discovery channel, each of the WUR AP information field including the WUR AP count field which represents a number of APs listed in the WUR AP information field.

20. A communication method, comprising:
receiving:
a Wake-up radio (WUR) Discovery element that indicates a WUR discovery channel used for transmission of a WUR Discovery frame from an access point (AP);
a WUR AP count indicated in a WUR AP count field, the WUR AP count indicating a number of APs which transmit WUR Discovery frame(s); and
the WUR Discovery frame on the WUR discovery channel; and
scanning the WUR discovery channel based on the WUR AP count.

* * * * *